(12) United States Patent
Lo et al.

(10) Patent No.: US 9,451,401 B2
(45) Date of Patent: Sep. 20, 2016

(54) APPLICATION TRANSPORT LEVEL LOCATION FILTERING OF INTERNET PROTOCOL MULTICAST CONTENT DELIVERY

(75) Inventors: Charles Nung Lo, San Diego, CA (US); Donald W. Gillies, San Diego, CA (US); Carlos M. D. Pazos, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/431,721

(22) Filed: Mar. 27, 2012

(65) Prior Publication Data
US 2012/0303745 A1    Nov. 29, 2012

Related U.S. Application Data

(60) Provisional application No. 61/491,069, filed on May 27, 2011, provisional application No. 61/515,767, filed on Aug. 5, 2011, provisional application No. 61/591,636, filed on Jan. 27, 2012.

(51) Int. Cl.
*H04W 4/02* (2009.01)
*H04H 60/91* (2008.01)
*H04H 60/00* (2009.01)
(Continued)

(52) U.S. Cl.
CPC ............... *H04W 4/021* (2013.01); *H04W 4/02* (2013.01); *H04H 60/00* (2013.01); *H04H 60/91* (2013.01); *H04L 67/04* (2013.01); *H04W 4/06* (2013.01)

(58) Field of Classification Search
CPC ......... H04N 7/16; H04N 5/445; H04N 7/773
USPC .................................................. 709/217–219
See application file for complete search history.

(56) References Cited

U.S. PATENT DOCUMENTS

| | | |
|---|---|---|
| 5,432,542 A | 7/1995 | Thibadeau et al. |
| 5,636,245 A | 6/1997 | Ernst et al. |
| 5,740,369 A | 4/1998 | Yokozawa et al. |

(Continued)

FOREIGN PATENT DOCUMENTS

| | | |
|---|---|---|
| CN | 102195994 A | 9/2011 |
| EP | 1085685 A2 | 3/2001 |

(Continued)

OTHER PUBLICATIONS

Advanced Television Systems Committee, "ATSC Candidate Standard: Non-Real-Time Content Delivery," Doc. TSG-876r1, Dec. 2, 2010, pp. 1-118.

(Continued)

*Primary Examiner* — Backhean Tiv
(74) *Attorney, Agent, or Firm* — Arent Fox LLP

(57) ABSTRACT

A method, an apparatus, and a computer program product for wireless communication are provided. The apparatus receives a plurality of data sets in a first FLUTE session. Each data set of the data sets includes an identifier and a target area associated with a broadcast. The apparatus receives a broadcast and an identifier associated with the broadcast in a second FLUTE session. The apparatus determines the target area associated with the received broadcast based on the identifier received with the received broadcast. The apparatus determines whether to keep the received broadcast based on whether a criterion associated with the target area is satisfied.

60 Claims, 20 Drawing Sheets

(51) Int. Cl.
*H04L 29/08* (2006.01)
*H04W 4/06* (2009.01)

(56) References Cited

U.S. PATENT DOCUMENTS

| | | | |
|---|---|---|---|
| 5,948,043 A | 9/1999 | Mathis | |
| 6,032,053 A | 2/2000 | Schroeder et al. | |
| 6,216,385 B1 | 4/2001 | Abe | |
| 6,522,250 B1 | 2/2003 | Ernst et al. | |
| 6,539,232 B2 | 3/2003 | Hendrey et al. | |
| 6,587,835 B1 | 7/2003 | Treyz et al. | |
| 6,801,779 B1 | 10/2004 | Liebenow | |
| 6,867,688 B2 | 3/2005 | Lamb | |
| 6,975,346 B2 | 12/2005 | Kumhyr | |
| 7,085,818 B2 | 8/2006 | Brown et al. | |
| 7,271,765 B2 | 9/2007 | Stilp et al. | |
| 7,565,153 B2 | 7/2009 | Alcock et al. | |
| 7,672,678 B2 | 3/2010 | Gaw | |
| 7,706,740 B2 | 4/2010 | Collins et al. | |
| 7,895,121 B2 | 2/2011 | Lukose et al. | |
| 8,311,048 B2 | 11/2012 | Mataga et al. | |
| 2001/0022558 A1 | 9/2001 | Karr, Jr. et al. | |
| 2001/0045886 A1 | 11/2001 | Minowa | |
| 2002/0087401 A1 | 7/2002 | Leapman et al. | |
| 2003/0002536 A1 | 1/2003 | Wong et al. | |
| 2003/0005451 A1 | 1/2003 | Connelly | |
| 2003/0040272 A1 | 2/2003 | Lelievre et al. | |
| 2003/0098929 A1 | 5/2003 | Nono | |
| 2003/0129994 A1 | 7/2003 | Nagatsuma et al. | |
| 2003/0169185 A1 | 9/2003 | Taylor | |
| 2005/0096065 A1 | 5/2005 | Fleischman | |
| 2005/0120050 A1 | 6/2005 | Myka et al. | |
| 2005/0177846 A1 | 8/2005 | Maruyama et al. | |
| 2005/0281029 A1 | 12/2005 | Inamoto | |
| 2006/0072538 A1* | 4/2006 | Raith | H04L 1/0041 370/349 |
| 2006/0080029 A1 | 4/2006 | Kodani et al. | |
| 2006/0121912 A1 | 6/2006 | Borjesson | |
| 2006/0133338 A1 | 6/2006 | Reznik et al. | |
| 2006/0156209 A1 | 7/2006 | Matsuura et al. | |
| 2006/0218586 A1 | 9/2006 | Pohjolainen et al. | |
| 2006/0229058 A1 | 10/2006 | Rosenberg | |
| 2006/0248090 A1 | 11/2006 | Bennett et al. | |
| 2006/0253453 A1 | 11/2006 | Chmaytelli et al. | |
| 2007/0026871 A1 | 2/2007 | Wager | |
| 2007/0054634 A1* | 3/2007 | Seppala | H04H 60/50 455/121 |
| 2007/0087756 A1 | 4/2007 | Hoffberg | |
| 2007/0101391 A1 | 5/2007 | Hwang | |
| 2007/0124395 A1 | 5/2007 | Edge et al. | |
| 2007/0168655 A1 | 7/2007 | Thomasson et al. | |
| 2007/0202886 A1 | 8/2007 | Dhebri et al. | |
| 2007/0204004 A1 | 8/2007 | Coyer et al. | |
| 2007/0259624 A1 | 11/2007 | Alizadeh-Shabdiz et al. | |
| 2007/0283268 A1* | 12/2007 | Berger et al. | 715/716 |
| 2008/0040760 A1* | 2/2008 | Cho | H04N 21/4331 725/87 |
| 2008/0046575 A1* | 2/2008 | Bouazizi | H04L 67/06 709/228 |
| 2008/0060000 A1* | 3/2008 | Drouet | H04N 7/163 725/34 |
| 2008/0072258 A1 | 3/2008 | Jeon et al. | |
| 2008/0101317 A1* | 5/2008 | Bouazizi | H04L 69/14 370/342 |
| 2008/0134264 A1 | 6/2008 | Narendra et al. | |
| 2008/0201746 A1 | 8/2008 | Xu et al. | |
| 2008/0248813 A1 | 10/2008 | Chatterjee | |
| 2008/0256139 A1 | 10/2008 | Jessee | |
| 2008/0307041 A1* | 12/2008 | Bouazizi | H04L 12/189 709/203 |
| 2009/0005067 A1 | 1/2009 | Ernst et al. | |
| 2009/0019509 A1 | 1/2009 | Horn et al. | |
| 2009/0089535 A1 | 4/2009 | Lohmar et al. | |
| 2009/0093259 A1* | 4/2009 | Edge | H04H 60/65 455/456.3 |
| 2009/0113019 A1 | 4/2009 | Yue et al. | |
| 2009/0177942 A1 | 7/2009 | Hannuksela et al. | |
| 2009/0178081 A1 | 7/2009 | Goldenberg et al. | |
| 2009/0207839 A1 | 8/2009 | Cedervall et al. | |
| 2009/0210510 A1* | 8/2009 | Bouazizi | H04N 7/162 709/207 |
| 2009/0252070 A1 | 10/2009 | Connors et al. | |
| 2009/0288116 A1 | 11/2009 | Zalewski | |
| 2009/0307564 A1 | 12/2009 | Vedantham et al. | |
| 2010/0050032 A1 | 2/2010 | Bichot et al. | |
| 2010/0146077 A1 | 6/2010 | Davies et al. | |
| 2010/0151882 A1 | 6/2010 | Gillies et al. | |
| 2010/0162334 A1 | 6/2010 | Suh et al. | |
| 2010/0162339 A1 | 6/2010 | Suh et al. | |
| 2010/0180007 A1* | 7/2010 | Suh et al. | 709/217 |
| 2010/0299702 A1* | 11/2010 | Lo | G06Q 20/123 725/39 |
| 2011/0010737 A1* | 1/2011 | Bouazizi | H04H 20/103 725/34 |
| 2011/0064082 A1 | 3/2011 | Zalewski | |
| 2011/0075612 A1* | 3/2011 | Guo et al. | 370/329 |
| 2011/0258049 A1 | 10/2011 | Ramer et al. | |
| 2011/0289542 A1 | 11/2011 | Kitazato et al. | |
| 2012/0239785 A1* | 9/2012 | Pazos | H04L 12/1881 709/219 |
| 2012/0303745 A1* | 11/2012 | Lo | H04W 4/02 709/217 |
| 2013/0097641 A1 | 4/2013 | Suh et al. | |
| 2013/0281007 A1 | 10/2013 | Edge | |

FOREIGN PATENT DOCUMENTS

| | | |
|---|---|---|
| EP | 1209886 A2 | 5/2002 |
| EP | 1903757 A1 | 3/2008 |
| EP | 2280523 A1 | 2/2011 |
| GB | 2363289 | 12/2001 |
| GB | 2404115 | 1/2005 |
| GB | 2406468 | 3/2005 |
| JP | S63310234 A | 12/1988 |
| JP | 1198549 A | 8/1989 |
| JP | 3131131 A | 6/1991 |
| JP | H0621905 A | 1/1994 |
| JP | 7220196 A | 8/1995 |
| JP | H088859 A | 1/1996 |
| JP | H08181702 A | 7/1996 |
| JP | H09212484 A | 8/1997 |
| JP | 10504392 T | 4/1998 |
| JP | 11041639 A | 2/1999 |
| JP | 2000252930 | 9/2000 |
| JP | 2000261462 A | 9/2000 |
| JP | 2001197021 A | 7/2001 |
| JP | 2002026836 A | 1/2002 |
| JP | 2002044012 | 2/2002 |
| JP | 2002135826 A | 5/2002 |
| JP | 2002186033 A | 6/2002 |
| JP | 2002232933 A | 8/2002 |
| JP | 2002237760 A | 8/2002 |
| JP | 2002531997 A | 9/2002 |
| JP | 2002290564 A | 10/2002 |
| JP | 2002325069 A | 11/2002 |
| JP | 2002334029 A | 11/2002 |
| JP | 2003018108 A | 1/2003 |
| JP | 2003030194 A | 1/2003 |
| JP | 2003143642 A | 5/2003 |
| JP | 2003153334 A | 5/2003 |
| JP | 2004112135 A | 4/2004 |
| JP | 2004128543 A | 4/2004 |
| JP | 2004236125 A | 8/2004 |
| JP | 2004297394 A | 10/2004 |
| JP | 2004533779 A | 11/2004 |
| JP | 2005051781 A | 2/2005 |
| JP | 2005165454 A | 6/2005 |
| JP | 2005308410 A | 11/2005 |
| JP | 2006033008 A | 2/2006 |
| JP | 2006080843 A | 3/2006 |
| JP | 2007129731 A | 5/2007 |
| JP | 2007135105 A | 5/2007 |
| JP | 2007295610 A | 11/2007 |
| JP | 2007300168 A | 11/2007 |

(56) References Cited

FOREIGN PATENT DOCUMENTS

| | | |
|---|---|---|
| JP | 2009539304 A | 11/2009 |
| JP | 2010502143 A | 1/2010 |
| KR | 20050049418 A | 5/2005 |
| RU | 2004121994 A | 1/2006 |
| RU | 2273956 C2 | 4/2006 |
| WO | WO9605678 A1 | 2/1996 |
| WO | WO0022860 A1 | 4/2000 |
| WO | 0033493 A1 | 6/2000 |
| WO | WO0174034 A2 | 10/2001 |
| WO | WO0186505 A2 | 11/2001 |
| WO | WO0186508 A2 | 11/2001 |
| WO | WO0219741 A2 | 3/2002 |
| WO | 0299983 A1 | 12/2002 |
| WO | WO03043210 A1 | 5/2003 |
| WO | WO03055142 | 7/2003 |
| WO | WO2004077291 A1 | 9/2004 |
| WO | WO2005086521 A1 | 9/2005 |
| WO | WO2005125238 A1 | 12/2005 |
| WO | WO2006100571 A1 | 9/2006 |
| WO | WO2007038355 | 4/2007 |
| WO | 2007049840 A1 | 5/2007 |
| WO | 2007078252 A2 | 7/2007 |
| WO | 2007142573 A1 | 12/2007 |
| WO | 2008025578 A1 | 3/2008 |
| WO | 2009034512 A2 | 3/2009 |
| WO | 2009046362 A1 | 4/2009 |

OTHER PUBLICATIONS

International Search Report and Written Opinion—PCT/US2012/031018—ISA/EPO—Jul. 9, 2012.

Faria G et al., "DVB-H: Digital Broadcast Services to Handheld Devices", Proceedings of the IEEE, vol. 94, No. 1, Jan. 2006.

Camarillo, et al., "The Session Description Protocol (SDP) Grouping Framework," Internet Engineering Task Force (IETF), Request for Comments: 5888, Obsoletes: 3388, Category: Standards Track, ISSN: 2070-1721, Jun. 2010.

Hui, et al., "A General Architecture in Support of Personalized, Interactive Multimedia Services in the Mobile Broadcast Convergent Environment," Testbeds and Research Infrastructure for the Development of Networks and Communities, 2007. TridentCom 2007, pp. 1-6.

Paila R Walsh Nokia M Luby Qualcomm T et al: "Flute—File Delivery over Unidirectional Transport; draft-ietf-rmt-flute-revised-11.txt", Flute—File Delivery Over Unidirectional Transport; draft-ietf-rmt-flute-revised-11.txt, Internet Engineering Task Force, IETF; Standardworkingdraft, Internet Society (ISOC) 4, Rue des Falaises CH-1205 Geneva, Switzerland, No. 11, Mar. 26, 2010, pp. 1-42, XP015067217.

Frojdh P., et al., "Study on 14496-12:2005/PDAM2 ALU/ FLUTE Server File Format", 78.MPEG Meeting; Oct. 23, 2006-Oct. 27, 2006; Hangzhou: (Motion PictureExpert Group of ISO/IEC JTC1/SC29/WG11), No. M13855, Oct. 13, 2006, XP030042523, ISSN: 0000-0233.

Joshi et al., "Simplified transforms for extended block sizes", ITU-T SG16 Q6 (VCEG), Document VCEG-AL30, 38th VCEG Meeting, Jul. 6-10, 2009, Geneva, CH, Jul. 3, 2009, XP030003711, Retrieved from the Internet: URL: http://wftp3.itu.int/av-arch/video-site/0906_LG/VCEG-AL30.zip.

Translation of Office Action in Japanese application 2008-532450 corresponding to U.S. Appl. No. 11/534,065, dated Dec. 21, 2010.

Nobena Y., "Rise of the idea <Opt-in Schedule>," Mobile greatly changes business style! [With graphics], All about "m-commerce," PHP Inc. Oct. 16, 2000, 1st edition, pp. 154-157.

Open Mobile Alliance, Service Guide for Mobile Broadcast Services, OMA-TS-BCAST Service Guide, Approved Version 1.1—Oct. 29, 2013, pp. 1-299.

Translation of Korean Office Action for Korean Application No. 2013-7031728 dated Apr. 20, 2015, 6 pages.

Translation of Office Action for Japanese Patent Application No. 2014-513503 dated Jan. 6, 2015, 6 pages.

QUALCOMM Incorporated, "Download Delivery Enhancements for MBMS (EMM-DDE)—Use cases, requirements and working assumptions Permanent Document," 3GPP TSG-SA4#67 TDoc S4-120276, Jan. 30, 2012, 3 pages.

Translation of First Office Action for Japanese Patent Application No. 2014-513503 dated Sep. 29, 2015, 5 pages.

Shin J., et al., "Design of MBMS Client Functions in the Mobile," International Journal of Electrical, Computer, Energetic, Electronic and Communication Engineering, World Academy of Science, Engineering and Technology, 2008, vol. 2, No. 6, pp. 1223-1226.

Translation of First Office Action issued for Japanese Application No. 2015-077699, dated Feb. 9, 2016, 3 pages.

* cited by examiner

APPLICATION TRANSPORT LEVEL LOCATION FILTERING OF INTERNET PROTOCOL MULTICAST CONTENT DELIVERY

CROSS-REFERENCE TO RELATED APPLICATION(S)

This application claims the benefit of U.S. Provisional Application Ser. No. 61/491,069, entitled "APPLICATION TRANSPORT LEVEL LOCATION FILTERING OF INTERNET PROTOCOL MULTICAST CONTENT DELIVERY" and filed on May 27, 2011, U.S. Provisional Application Ser. No. 61/515,767, entitled "APPLICATION TRANSPORT LEVEL LOCATION FILTERING OF INTERNET PROTOCOL MULTICAST CONTENT DELIVERY" and filed on Aug. 5, 2011, U.S. Provisional Application Ser. No. 61/591,636, entitled "APPLICATION TRANSPORT LEVEL LOCATION FILTERING OF INTERNET PROTOCOL MULTICAST CONTENT DELIVERY" and filed on Jan. 27, 2012, all of which are expressly incorporated by reference herein in their entirety.

BACKGROUND

1. Field

The present disclosure relates generally to communication systems, and more particularly, to application transport level location filtering of Internet protocol (IP) broadcast/multicast content delivery.

2. Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

In an aspect of the disclosure, a method, an apparatus, and a computer program product for wireless communication are provided. The apparatus receives a plurality of data sets in a first file delivery over unidirectional transport (FLUTE) session. Each data set of the data sets includes an identifier and a target area associated with a broadcast. The apparatus receives a broadcast and an identifier associated with the broadcast in a second FLUTE session. The apparatus determines the target area associated with the received broadcast based on the identifier received with the received broadcast. The apparatus determines whether to keep the received broadcast based on whether a criterion associated with the target area is satisfied.

In an aspect of the disclosure, a method, an apparatus, and a computer program product for wireless communication are provided. The apparatus receives a data set in a FLUTE session. The data set includes a target area associated with a broadcast and a time at which the broadcast will be transmitted. The apparatus determines a location of the apparatus. The apparatus determines whether a criterion is satisfied based on whether the determined location is within the target area. The apparatus receives the broadcast associated with the data set in the FLUTE session only when the criterion is satisfied.

DETAILED DESCRIPTION

Figure 1:
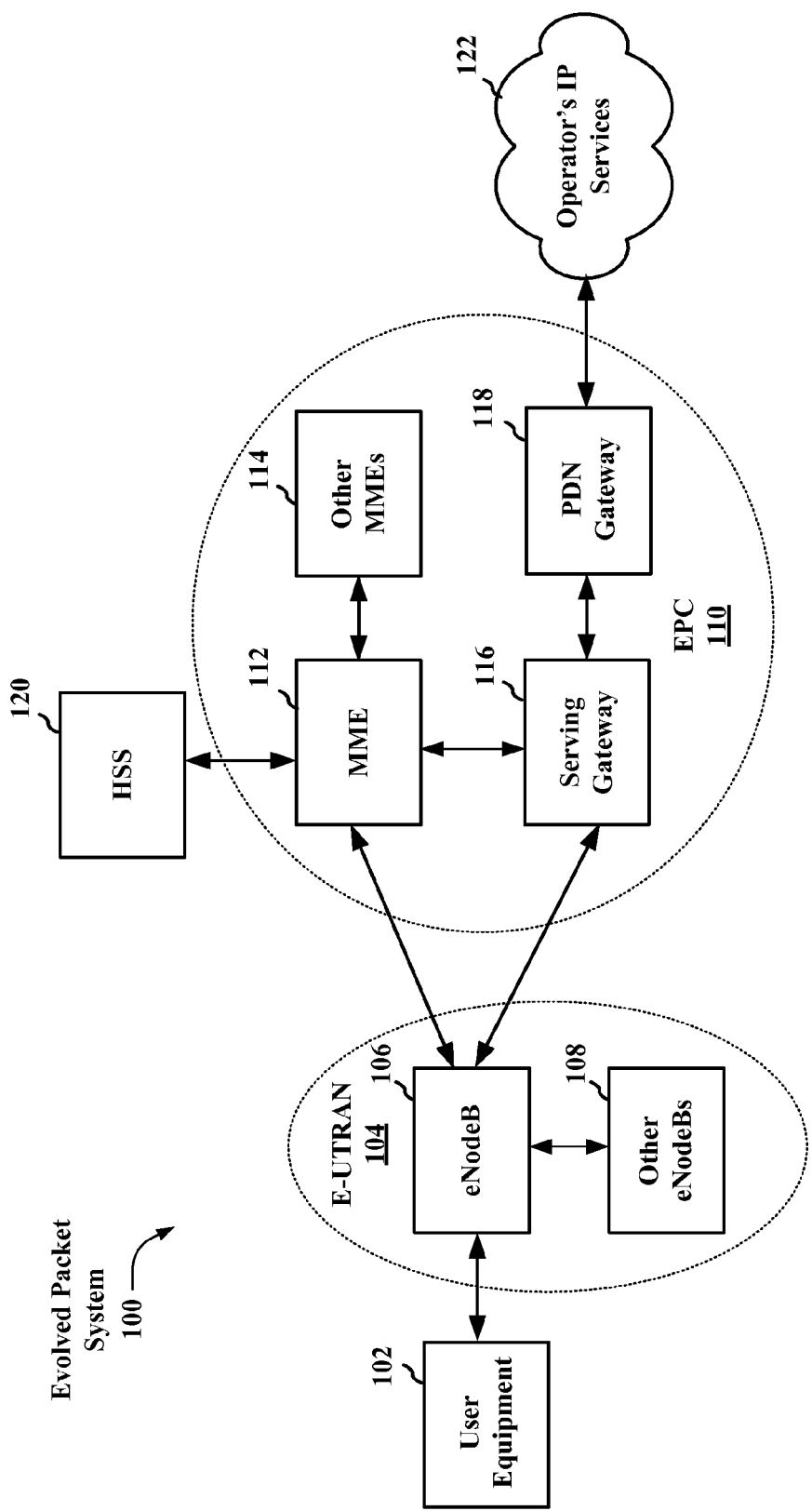
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's IP Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108. The eNB 106 provides user and control planes protocol terminations toward the UE 102. The eNB 106 may be connected to the other eNBs 108 via an X2 interface (e.g., backhaul). The eNB 106 may also be referred to as a base station, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected by an S1 interface to the EPC 110. The EPC 110 includes a Mobility Management Entity (MME) 112, other MMEs 114, a Serving Gateway 116, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include the Internet, the Intranet, an IP Multimedia Subsystem (IMS), and a PS Streaming Service (PSS).

Figure 2:
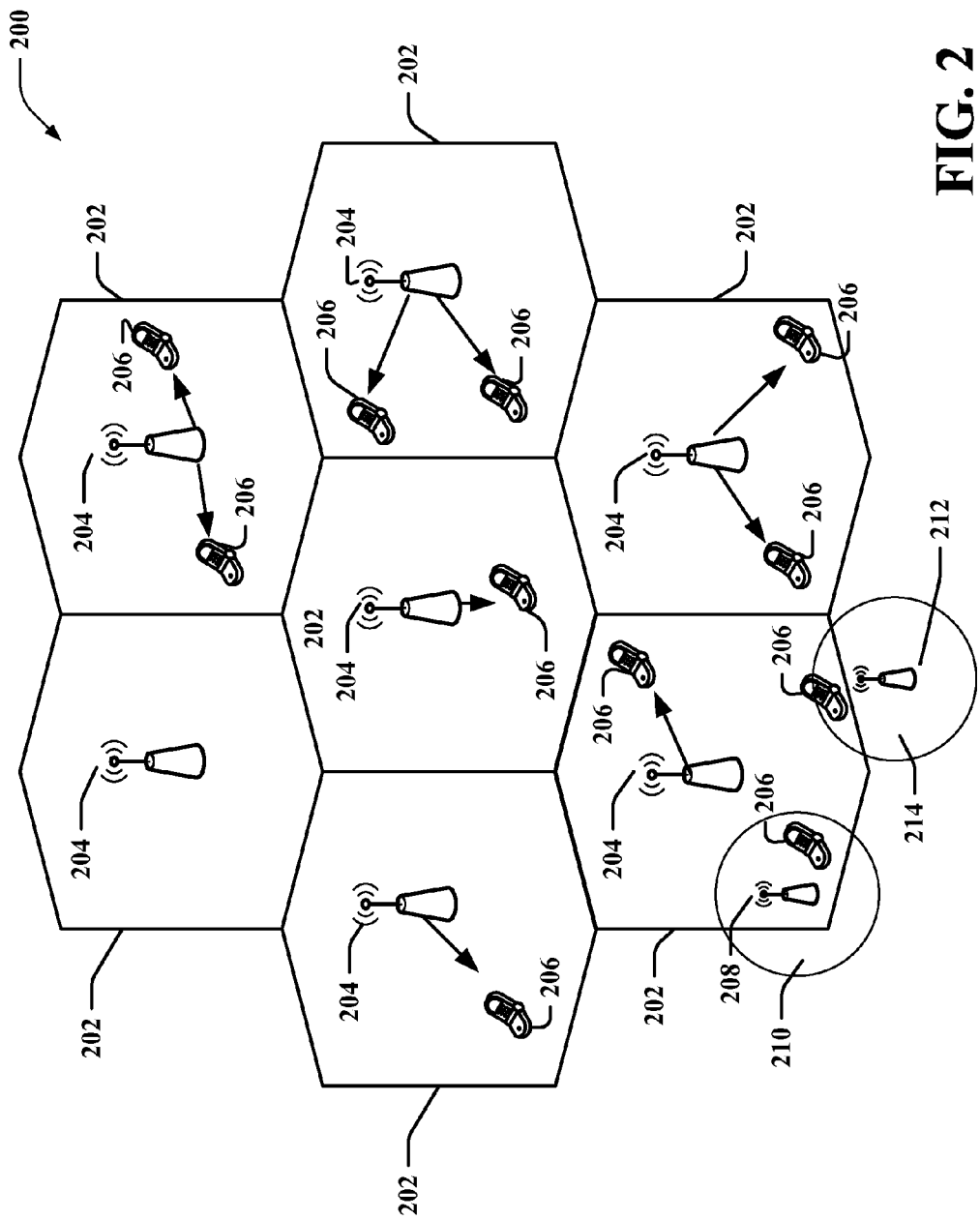
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. A lower power class eNB 208 may be referred to as a remote radio head (RRH). The lower power class eNB 208 may be a femto cell (e.g., home eNB (HeNB)), pico cell, or micro cell. The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116.

The modulation and multiple access scheme employed by the access network 200 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (Wi-MAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data steams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
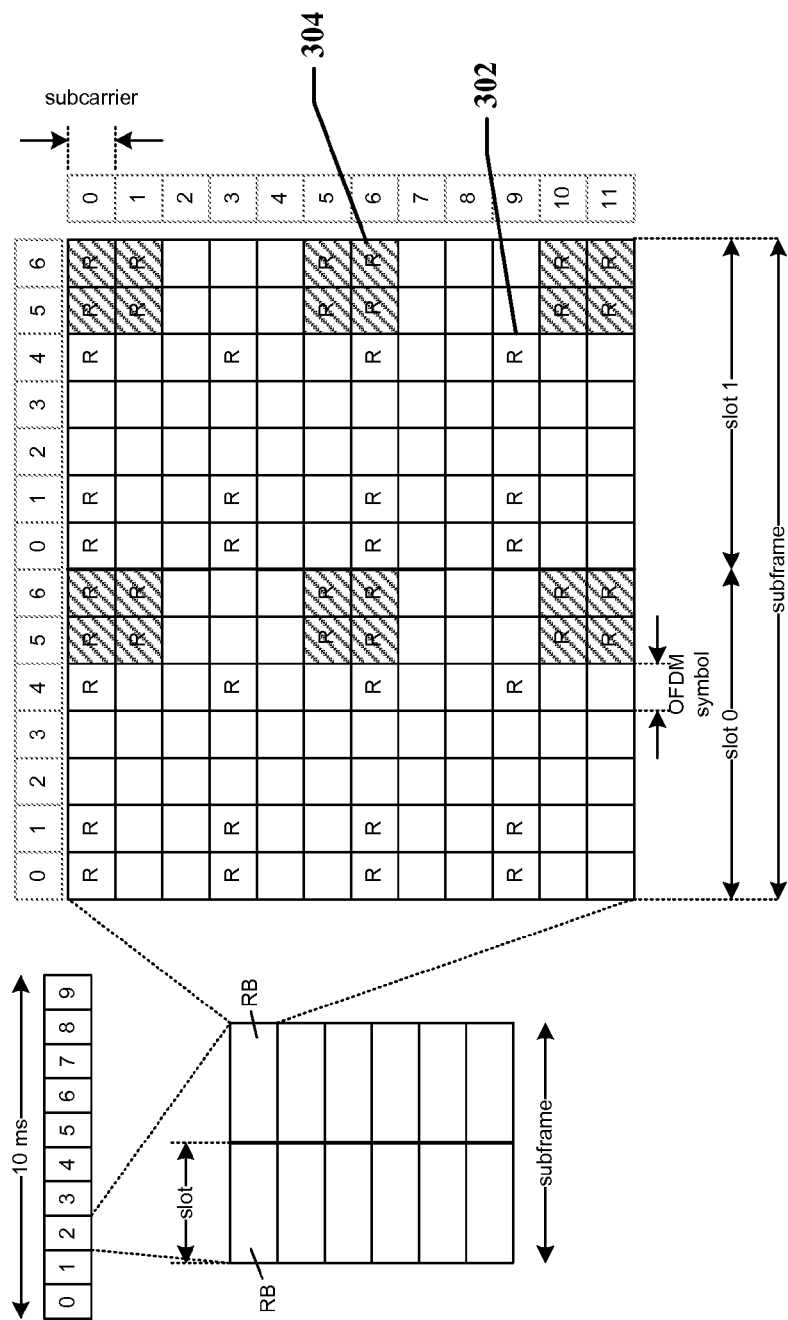
FIG. 3 is a diagram illustrating an example of a DL frame structure in LTE.

FIG. 3 is a diagram 300 illustrating an example of a DL frame structure in LTE. A frame (10 ms) may be divided into 10 equally sized sub-frames. Each sub-frame may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, as indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
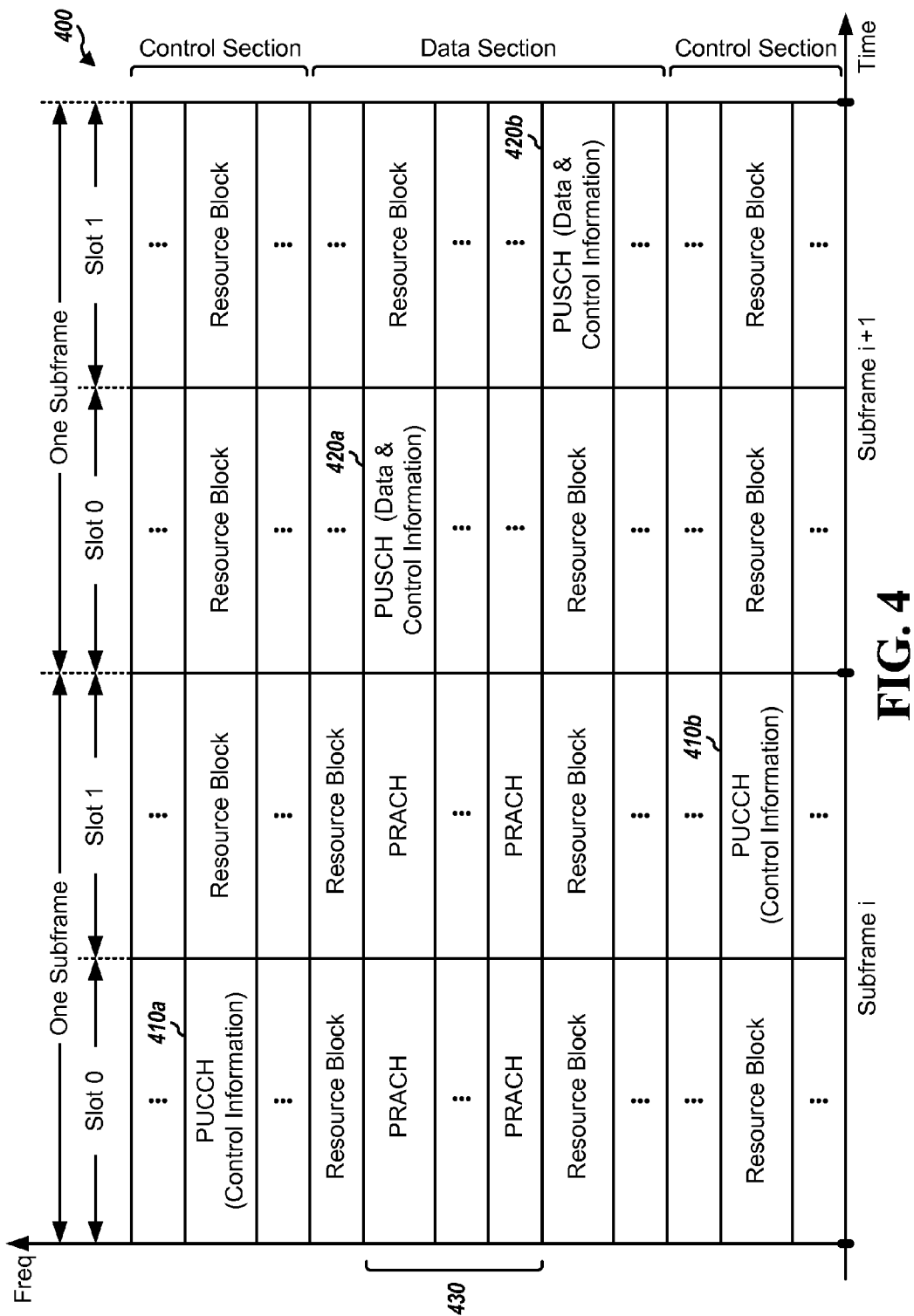
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a sub-frame and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
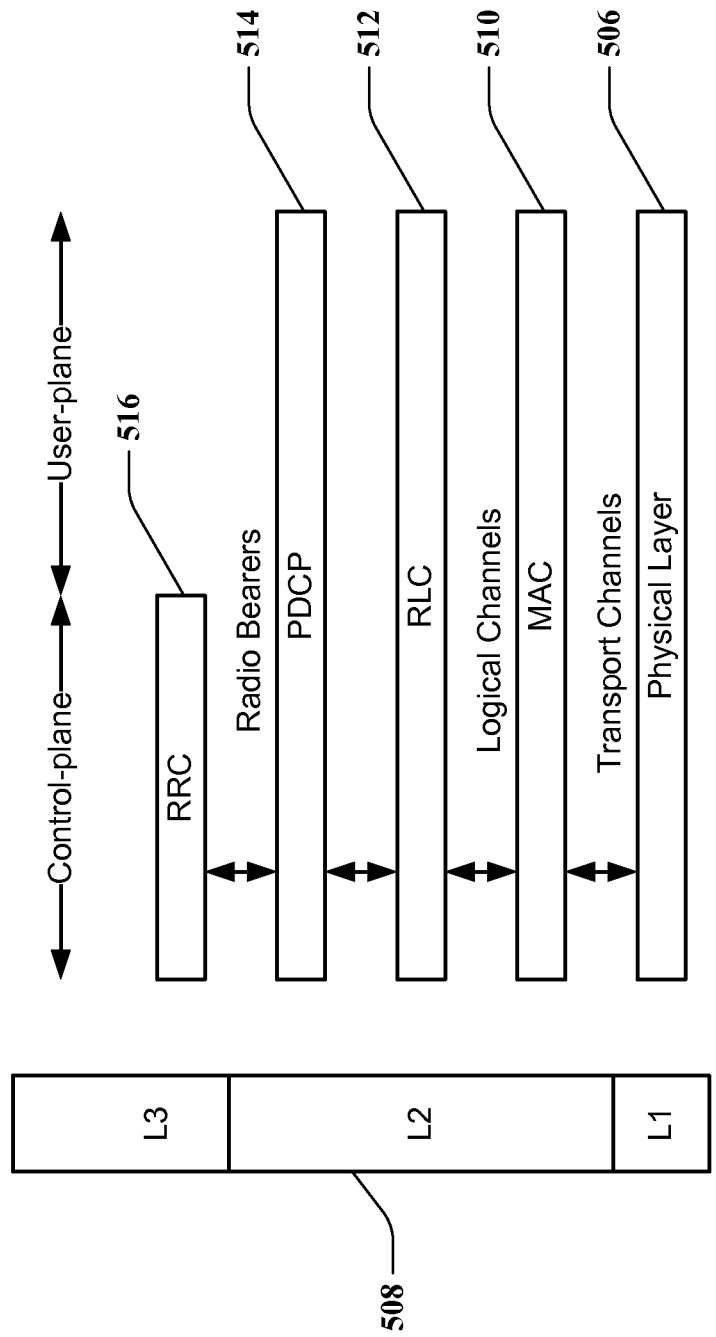
FIG. 5 is a diagram illustrating an example of a radio protocol architecture for the user and control planes.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the eNB and the UE.

Figure 6:
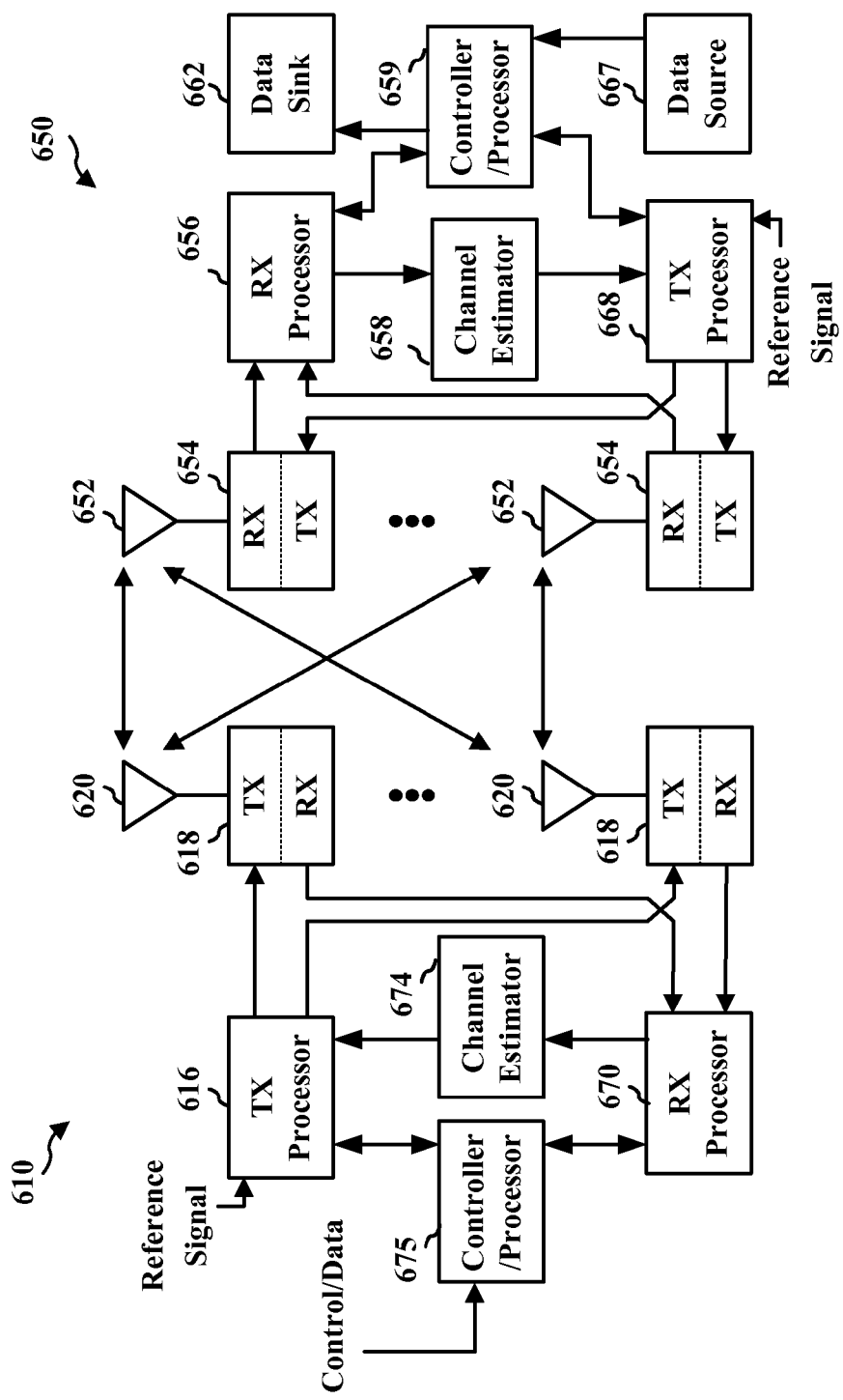
FIG. 6 is a diagram illustrating an example of an evolved Node B and user equipment in an access network.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions includes coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

In a multicast content delivery system, such as cellular or broadcast network based technologies such as 3GPP Multimedia Broadcast Multicast Service (MBMS), 3GPP2 Broadcast and Multicast Services (BCMCS), Digital Video Broadcasting—Handheld (DVB-H), Advanced Television Systems Committee—Mobile/Handheld (ATSC-M/H), etc., there is considerable interest in supporting the delivery of location-based service/content. UMTS LTE allows for shared (multicast) types of services such as digital broadcast radio and digital video broadcast. The evolved MBMS (eMBMS) feature is provided with Multi-Media Broadcast over a Single Frequency Network (MBSFN) mode of operation and can simultaneously transmit the same media signals using UMTS LTE eNBs to multiple recipients in the same geographic region. Examples of location-based services are location-specific advertisements or traffic alerts. By the nature of broadcast operation, as well as for efficient service provisioning, distribution of these services may occur over a large geographic area, for example broadcast by one or more transmitter sites covering a portion of, or an entire metropolitan area. Location specific contents are often relevant only to users located in a specific, typically much smaller, area relative to the broadcast reception area. For example, a located-based ad or coupon may be targeted to end users situated nearby a particular store running a time-limited sale or promotion. Further, traffic alerts are generally most relevant for motorists likely to be affected by the incident—for example heading to or located nearby the section of highway where the jam occurs.

Location-based targeting information (i.e., metadata) may be delivered along with broadcast content at the application service level or at the radio access network (RAN) level. For example, at the application service level, location filter data may be carried in an electronic service guide (ESG), and at the RAN level, metadata may be provided through RAN control channels. With respect to the application service level, service announcement/discovery information, such as the MBMS User Service Description could be extended to carry filter information for the associated service. With respect to the RAN level, location metadata may be signaled in the Multicast Control Channel (MCCH) logical channel delivered over the Multicast Channel (MCH), which is physical channel in E-UTRAN.

Signaling location filtering data in the ESG or in service announcement/discovery information provides for a lower device battery power drain as compared to RAN-based signaling, as the UE knows a-priori whether the broadcast contents are of interest from the user/device location perspective, and turns on the RF receiver to download such contents only during the associated broadcast interval. On the other hand, such application level metadata may be designed to be semi-static, and frequent updating may consume excessive broadcast bandwidth and increase the device processing load of ESG/announcement information. RAN level signaling of filter information of the associated service/contents, although consuming greater battery power relative to the ESG/announcement info mechanism, allows the information to be changed more dynamically/frequently. The RAN level signaling may be useful to enable certain types of location-based broadcast services such as real-time traffic alerts, whereby traffic conditions for a given geographic area are relatively dynamic and need to be updated frequently.

Figure 7:
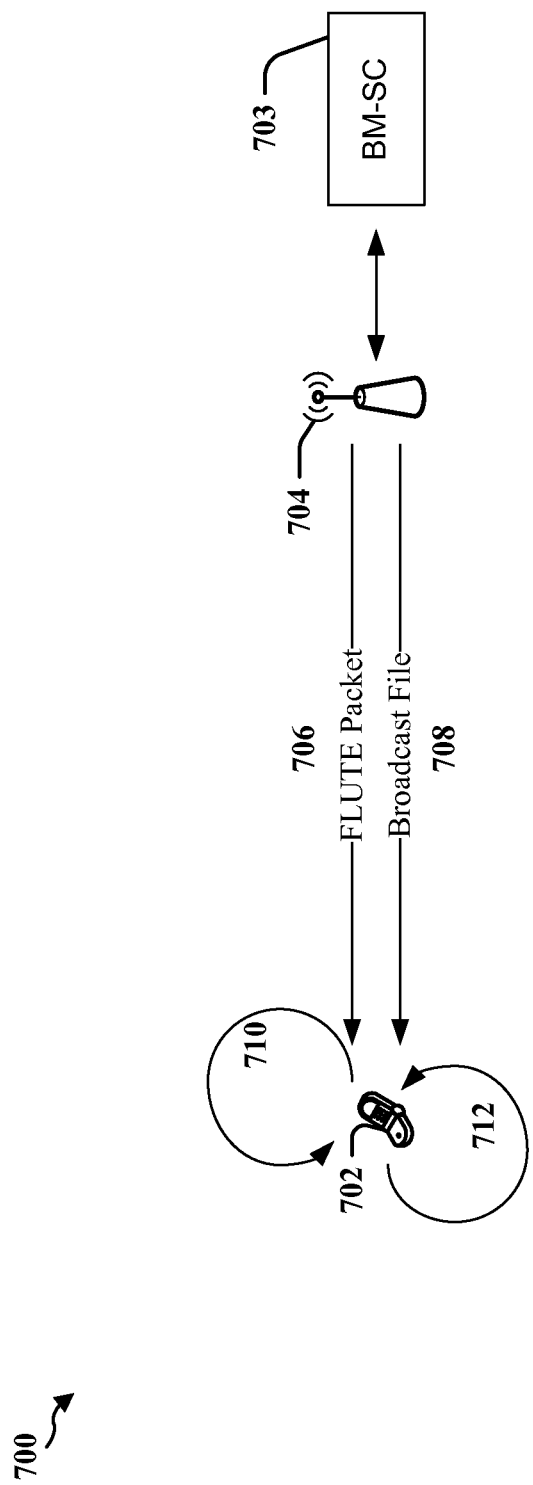
FIG. 7 is a diagram for illustrating an exemplary method.

A solution for location metadata signaling that combines the benefits of lower battery power consumption as provided by the application service level signaling, together with the dynamic updatability of the RAN level mechanism is discussed infra in relation to FIG. 7. A solution for delivery of location metadata in user service discovery/announcement at the application service level is discussed infra in relation to FIG. 11. Both of these methods provide for location-based targeting of broadcast services and/or location-based targeting of particular broadcast content (e.g., an advertisement specific for a particular area).

FIG. 7 is a diagram 700 for illustrating an exemplary method. In the exemplary method, the UE 702 enters into a user-data session with a broadcast-multicast service center (BM-SC) 703 through an eNB 704. The timing of the user-data session is announced in the user service discovery/announcement. During the session, the UE 702 receives a plurality of FLUTE packets that include filter information (e.g., target location information, user profile/preferences, device capabilities). The filter information may be included within a file delivery table (FDT) instance in which a transmission object identifier (TOI) is equal to zero. Alternatively, the filter information may be included within a data file in which the TOI is non-zero. The filter information includes an identifier and a target area associated with a broadcast file. The broadcast file may be associated with a broadcast or multicast. The UE 702 also receives a broadcast file 708 and an identifier associated with the broadcast file. The UE 702 looks up the identifier for a received broadcast file in the filter information. If the filter information includes target location information, the UE 702 determines a target area associated with the received broadcast file. Based on the target area, the UE 702 determines whether one or more criterion associated with the target area are satisfied. If the criteria are satisfied, the UE 702 keeps the received broadcast file 708 in order to provide information related to the broadcast file 708 to the user of the UE 702 (710). Otherwise, if the criteria are unsatisfied, the UE 702 deletes the received broadcast file 708 without providing information related to the broadcast file 708 to the user of the UE 702 (710).

In order to determine whether the criteria are satisfied, the UE 702 determines its location. The location may be a previous location, a current location, or a predictive future location. Based on the determined location, the UE 702 can determine whether the criteria are satisfied. For example, if the determined location is within the target area, the criteria may be satisfied, assuming other criteria are also satisfied, and if the determined location is not within the target area, the criteria are unsatisfied.

The target location information may further include a time associated with the target area. In such a configuration, the criteria are associated with the time. For example, the target location information may include a duration, a start time, and an end time, and the criteria may be satisfied if the UE 702 has previously been located or is currently located within the target area for a time period greater than or equal to the duration between the start time and the end time. For a specific example, the duration may be 20 minutes, the start time 10 a.m. of May 2, 2010, and the end time 12 p.m. of May 2, 2010. Assuming the date is May 2, 2010 and the time is 10 a.m., the criteria will be satisfied when the UE 702 is located within the target area for at least 20 minutes between the time of 10 a.m. and 12 p.m. If the date is May 3, 2010, the criteria is satisfied if the UE 702 was located within the target area for at least 20 minutes between the time of 10 a.m. and 12 p.m. on May 2. If the target location information includes only a start time and end time, but not a duration, the criteria may be satisfied if the UE 702 has previously been located or is currently located within the target area between the time starting at the start time and the time ending at the end time.

The target location information may further include a present level of confidence that the UE 702 has been located, is located, or will be located in the target area based on the time and an absent level of confidence that the UE 702 has not been located, is not located, or will not be located in the target area based on the time. The present level of confidence is a level of confidence of a previous presence, a current presence, or a future presence that the UE 702 is in the target area. The absent level of confidence is a level of confidence that the UE 702 was previously absent, is currently absent, or will be absent from the target area. The criteria may be associated with the present level of confidence and the absent level of confidence. The present level of confidence and the absent level of confidence may be useful in determining whether the UE 702 is likely to be within the target area within a future time period. When the UE 702 is likely to be within the target area within a future time period, and that likelihood is greater than the present level of confidence and/or the unlikelihood is less than the absent level of confidence, the criteria may be satisfied such that a broadcast file associated with the target area may be processed and information associated with the broadcast file provided to a user of the UE 702.

The target area within the target location information may be one or more target areas. Each of the target areas may be a cell identifier associated with a particular eNB; an identifier defining boundaries of a physical area, such as a zip code or a county name; or otherwise data defining boundaries of a physical area, such as a radius and a latitude and a longitude, a plurality of latitudes and longitudes, street names, and the like. The session may be a FLUTE user-data session and the identifier may be a TOI. Further, the target location information may further include at least one additional target area and logical operators. In such a configuration, the satisfaction of the criteria is based on said target area and said at least one additional target area as a function of the logical operators. By including additional target areas and logical operations, the criteria may be satisfied, for example, if the UE 702 is within the target area X or the target area Y for the requisite duration during the specified time period.

As discussed supra, the broadcast file 708 may be received with the filter information. However, in a second exemplary method, the UE 702 is able to determine when a particular broadcast file will be transmitted and ignore the broadcast file (e.g., turn off its receiver) based on whether criteria are unsatisfied. In the second exemplary method, the UE 702 enters into a session with a BM-SC 703 through an eNB 704. During the session, the UE 702 receives a FLUTE packet 706 with filter information. The filter information may include target location information. The target location information includes a target area associated with a broadcast file and a time at which the broadcast file will be transmitted. The UE 702 determines its location and whether criteria are satisfied based on whether the determined location is within the target area (712). If the criteria are satisfied, the UE 702 receives the broadcast file 708 associated with the target location information. If the criteria are unsatisfied, the UE 702 turns off its receiver so as not to receive the broadcast file 708 or otherwise ignores the broadcast file 708 by refraining from decoding or further decoding the broadcast file 708.

Location-based targeting of broadcast services may be enabled through location metadata in an application transport protocol packet header of the FLUTE protocol. The FLUTE protocol is designed to support delivery of files over IP multicast, and is specified for download delivery of file content in various cellular and downlink-only broadcast systems specifications. These include MBMS, BCMCS, DVB-H, and Open Mobile Alliance (OMA) Mobile Broadcast Services Enabler Suite (BCAST). While exemplary embodiments are discussed within FLUTE specifically, the exemplary embodiments may also apply to Asynchronous Layered Coding (ALC).

The FLUTE protocol is a specific transport application of ALC. The FLUTE protocol adds the following functionalities: (1) definition of file delivery session built on the ALC object delivery session framework, (2) in-band signaling of transport parameters of the ALC session, (3) in-band signaling of the attributes and source locations of delivered files, and (4) detailed relationships among multiple files for combined delivery within a session. In one configuration, within (3), the FDT instance is extended to include the target area and other associated parameters. In such a configuration, file attributes may be transmitted in FLUTE by the definition of the FDT, each instance of which provides a set of descriptors of the broadcast files being delivered, such as each of the broadcast file's identifier, size, content encoding method, etc.

Figure 8:
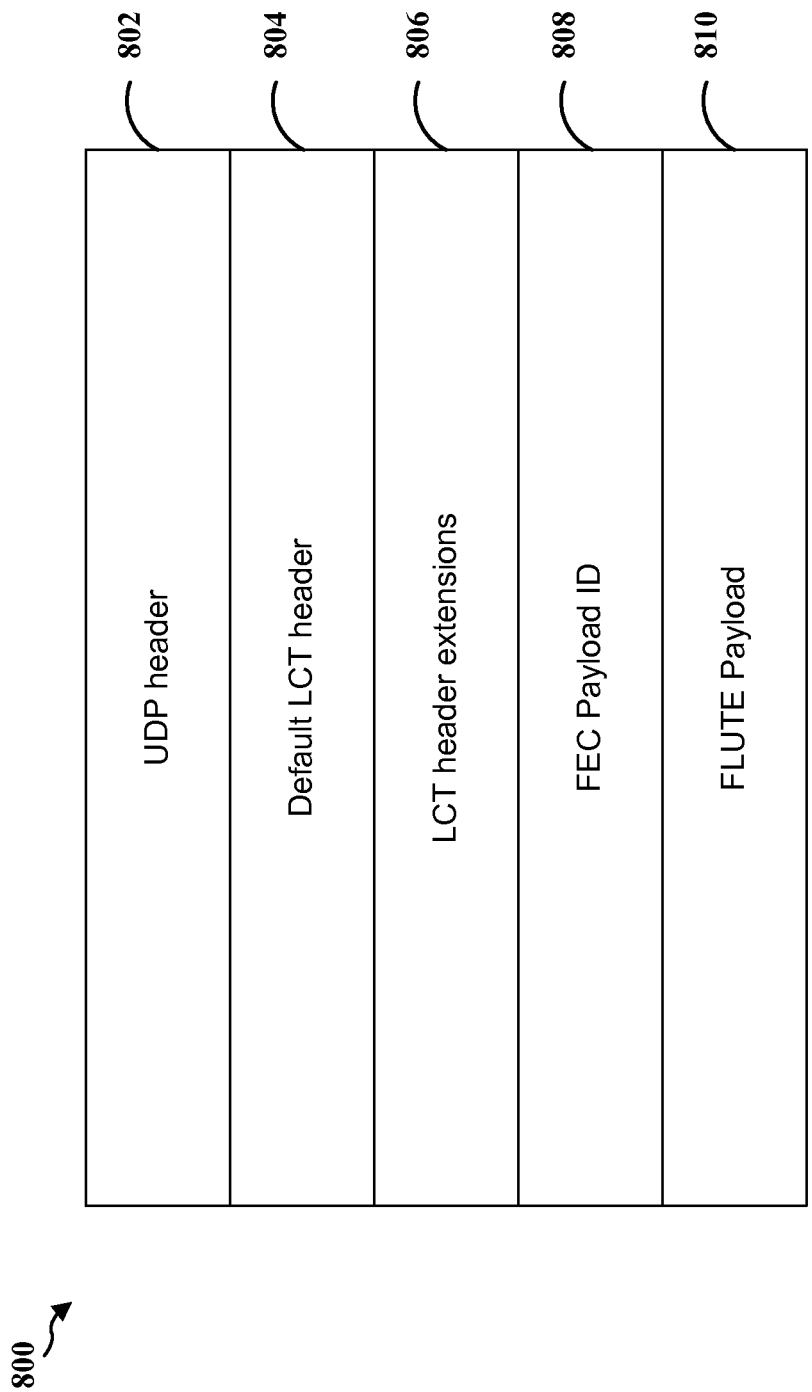
FIG. 8 is a diagram illustrating a FLUTE packet.

FIG. 8 is a diagram 800 illustrating a FLUTE packet. The packet includes a User Datagram Protocol (UDP) header 802, a default LCT header 804, LCT header extensions 806, a forward error correction (FEC) payload identifier 808, and the FLUTE payload 810. A particular FLUTE payload 810 may include the filter information. The filter information may be carried within file data within a FLUTE packet (TOI≠0) or within an FDT instance within a FLUTE packet (TOI=0).

Figure 9:
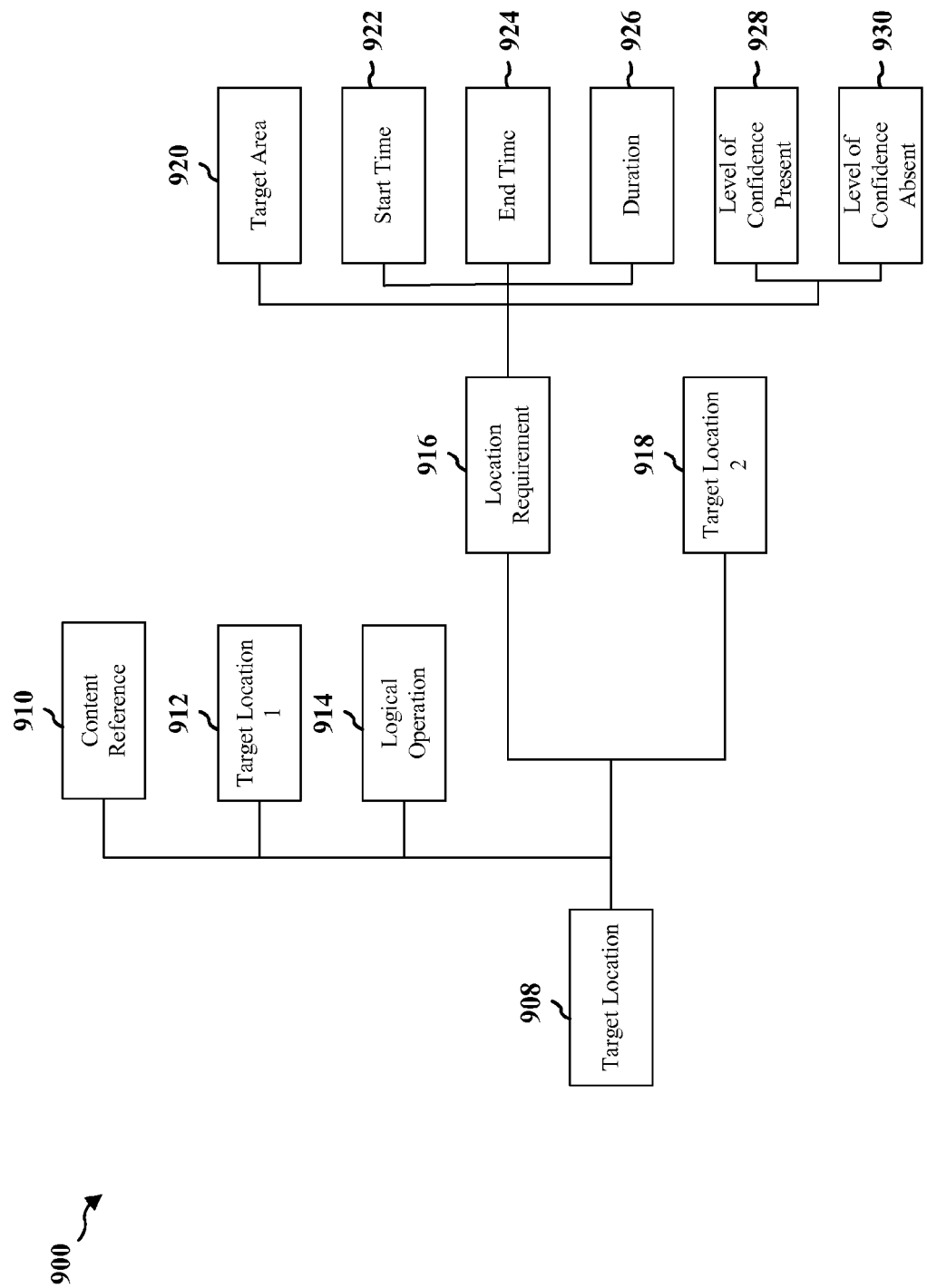
FIG. 9 is a diagram illustrating filter information included within a FLUTE payload.

FIG. 9 is a diagram 900 illustrating information included within a FLUTE payload 810. A FLUTE payload 810 may include a target location 908. The target location 908 may be defined by a content reference 910, a target location 1 912, a logical operation 914, and a choice between a location requirement 916 and target location 2 918. The content reference 910 identifies/indicates the content item for which the target location applies. The location requirement 916 may be defined by a target area 920, a start time 922, an end time 924, a duration 926, a level of confidence that the UE is present 928, and a level of confidence that the UE is absent 930. The target location 908 may be a child element of the XML element 'File' of the FDT, and along with its sub-parameters, are location filtering data representing criteria on the UE's position for which the associated broadcast content item is deemed appropriate/desirable for reception. The target location 908 may be carried in the FLUTE payload 810. When the FLUTE payload 810 carries an FDT instance, the FLUTE payload 810 additionally carries FDT instance data. The location filter may specify past, current, or an expected future location of the UE.

A brief summary, including characterization of location filter contents by present, past, and current location, as well as level of confidence of the UE residing within the target area, is provided infra. Current location data associated with the broadcast content item allows targeting content reception by a UE located in the vicinity of the specified area (one or more specified target locations), for which a) the content transmission is imminent (e.g., within the next few minutes) and b) validity time for the content covers the present and near future. An example use case is targeting the distribution of a broadcast discount coupon to users located nearby one or more Starbucks stores for a promotion good from now through, say, the next hour. Another use case might be delivery of a (location-specific) traffic alert about a current car accident and related traffic jam on a specific section of a highway.

Past location data, or location history, if maintained on the UE and found to match the location metric in the location filter, could represent a good predictor of future location. For example, a person who shops regularly (e.g., at certain days of the week/time of the day) at a department store, and whose location history for such behavior is logged, may be deemed likely to frequent the same store in the future during those same day of week/time of day. Such person could be a good candidate to target the reception of a related sales advertisement at that store. Past location metadata, if sent, should be associated with a specific time interval.

Future location data, if transmitted, could be matched against entries in the user's electronic calendar or appointment book on the UE (assuming the UE has access to those applications), or correlated to his/her current velocity of motion and heading, to determine likelihood of location in the associated target area. Similar to past location, location filter signaling future location should be associated with a specific time interval.

Position location estimates, no matter the technology employed (e.g., global positioning system (GPS), assisted GPS (A-GPS), and purely cellular-based mechanisms such as enhanced time difference of arrival (E-TDOA)), can only yield probabilistic results (e.g., 75% confidence level the UE is located within a 50-ft radius of a geographic point given by latitude and longitude coordinates). Therefore, a metric in the location filter may be the minimum required level of confidence that the UE should meet to satisfy the criterion defined in the location filter in order to receive the corresponding content. That target confidence level may be set by the content/service provider.

A property of using the FDT instance to signal location targeting is the ability to selectively target reception by location, individual file contents belonging to a location-based download delivery service. It allows the service provider to provision a single evolved MBMS (eMBMS) user service for broadcast over a certain broadcast area or zone, while fully capable of identifying one or more sub-areas within that zone for which the associated content is targeted for reception. This is achieved by placing the target location parameters under the 'File' element of the FDT. On the other hand, should the intention be for the location target to apply to all broadcast files described by the associated FDT Instance, the location targeting data could be placed under the 'File Instance' element of the FDT.

Assuming the presence of metadata that indicates the transmission time(s) of the content file associated with the location targeting data, and depending on the time difference between the acquisition and subsequent processing of the FDT, and transmission of that file, the UE can determine whether it should (a) keep the already downloaded file based on whether criteria associated with the target area are satisfied, (b) download the to-be transmitted file based on whether criteria associated with the target area are satisfied, or (c) continue to download the partially received file based on whether criteria associated with the target area are satisfied. In (a), the time spacing between the FDT transmission and subsequent file transmission, in its entirety, is assumed to be sufficiently small such that the file must be completely received before the device can determine whether it should be retained. In (b), the time spacing between FDT and subsequent file transmission is sufficiently apart such that the device can process the FDT to determine whether it should receive the later broadcast file. In (c), the reception of the FDT preceding the initial file transmission may be corrupted such that a portion of the file must be downloaded, and only upon successful acquisition of a repeated FDT transmission can the device decide whether to continue to download the remainder of the file.

An exemplary source of the content file transmission time is the FDT extension element 'broadcastWindow', as child element of the 'File' element of the FDT. In this case, the file transmission time information, similar to target location information, is a component of the FDT, sent in-band to the session carrying the file data. Another exemplary source of the content file transmission time is the 'Session Description' fragment of the MBMS User Service Description data.

Figure 10:
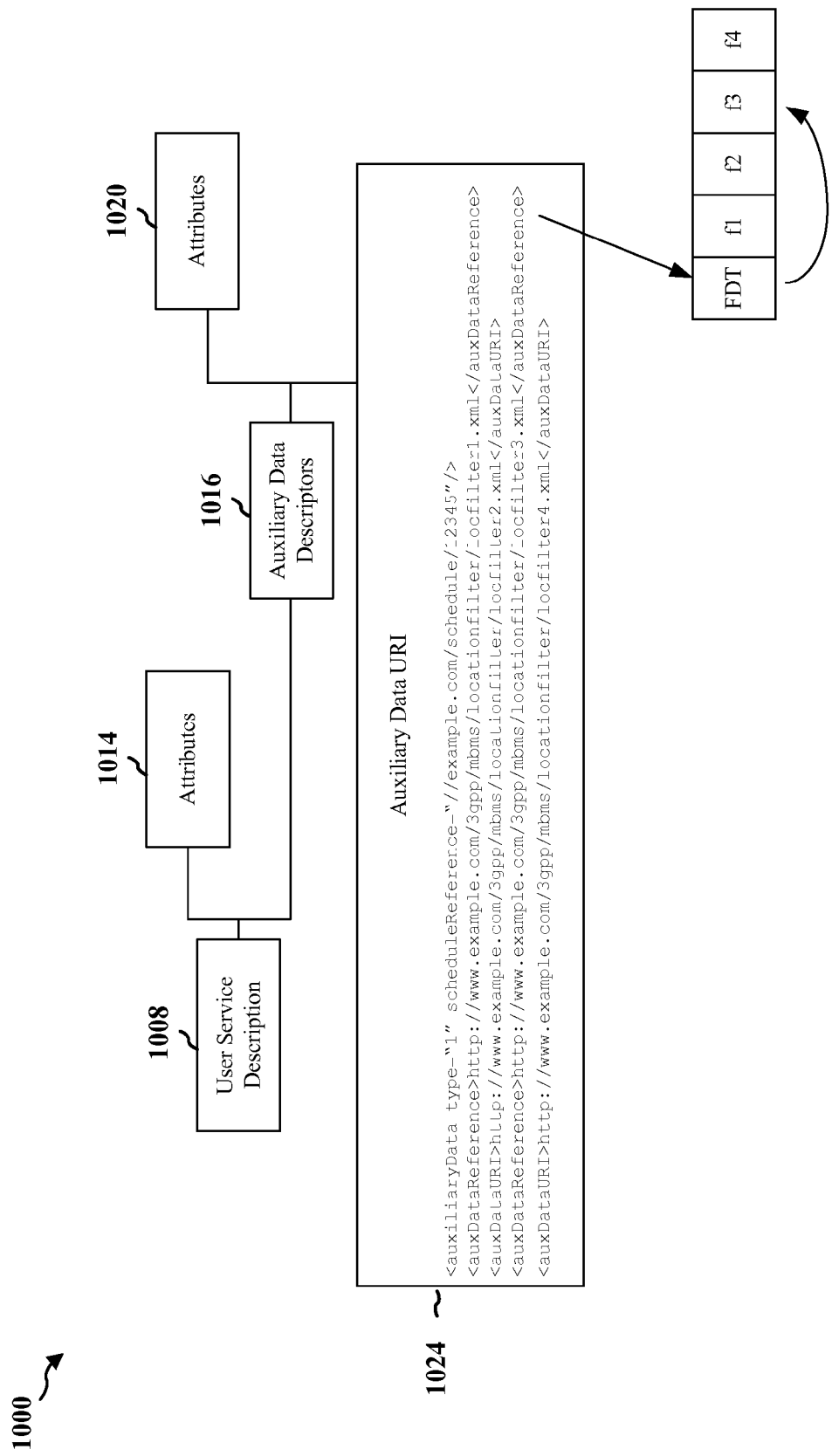
FIG. 10 is a diagram illustrating an auxiliary data element under a user service description.

FIG. 10 is a diagram 1000 illustrating an auxiliary data element under a user service description. As shown in FIG. 10, a user service description 1008 may include attributes 1014 and auxiliary data descriptors 1016. The attributes 1014 are the attributes (e.g., a service identifier) of the user service description. The auxiliary data descriptors 1016 may include attributes 1020 and one or more auxiliary data URIs 1024. The attributes 1020 are attributes (e.g., type, reference to a schedule fragment, or reference to a session description fragment) of the auxiliary data descriptors 1016. The one or more auxiliary data URIs 1024, when matched with content-location attributes within an FDT instance, identifies one or more auxiliary files that contain filter information. Location targeting information may be carried as a specific type of an auxiliary data file, associated with the main service, and which is announced in Service Announcement/Discovery information, such as the MBMS User Service Description. An auxiliary file announced in the service announcement data as 'Location_Info' implies its association with a location-specific broadcast service, and furthermore, indicates that the auxiliary data will be carried in-band to the main service on the same FLUTE session. Each auxiliary file is identified by its file URI stored in the auxiliary data URI 1024. The file URI will be compared by the receiver against the 'Content-Location' attribute of the FLUTE FDT. 'Content-Location' in the FDT identifies the file object(s) to be delivered on the FLUTE session in the form of a URI. A match in URI values identifies the corresponding file object in the FLUTE session containing location filtering data associated with one or more content files of the main service.

After identifying the set of one or more file objects in the FLUTE session representing location filter data, the mapping between these location filters to content file(s) of the main service may be determined. The content reference 910 enables this correlation, as each location filter in the auxiliary data file may contain one or more content references 910 whose value(s) may be matched against the file URI(s) of content items(s) belonging to the user service. For location-dependent services, the mapping provides a means to bind each location filter to the one or more content items of the service to which the filter applies.

Figure 11:
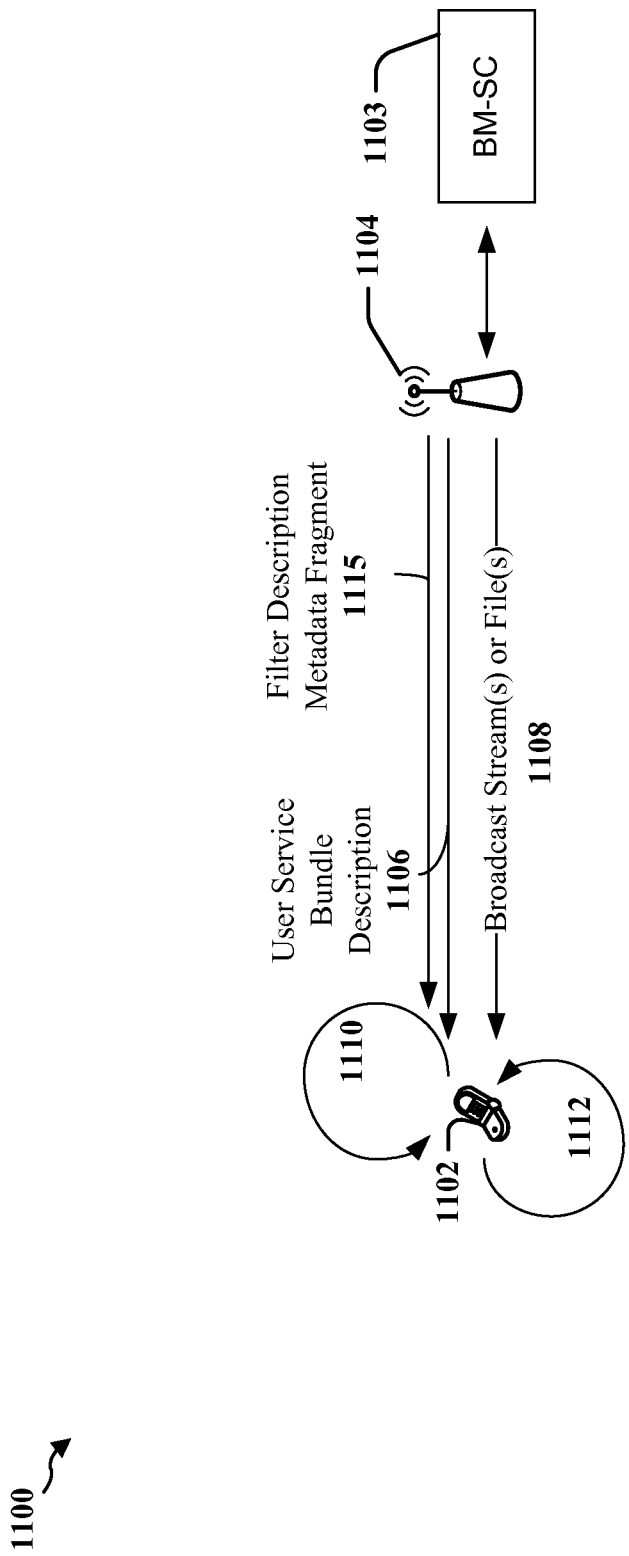
FIG. 11 is a diagram for illustrating a second exemplary method.

FIG. 11 is a diagram 1100 for illustrating a second exemplary method. In the second exemplary method, the UE 1102 enters into a service announcement session with a BM-SC 1103 through an eNB 1104. During the session, the UE 1102 receives a user service bundle description 1106 and a filter description metadata fragment 1115. The user service bundle description 1106 is associated with a filter description metadata fragment 1115 that includes filter information for all services associated with the user service bundle description 1106, for all content items associated with a particular service, or for one or more individual content items associated with one or more services. When the filter description metadata fragment 1115 includes filter information for a particular broadcast (i.e., one individual content item), the filter description metadata fragment 1115 may further contain an identifier associated with the particular broadcast. The broadcast may be a file or a stream. The broadcast file or stream may be associated with a broadcast or multicast.

If the filter information is for all services associated with the user service bundle description 1106 or for all content items associated with a particular service, the UE determines when one or more criterion associated with the filter information are satisfied, and when criteria associated with the filter information are satisfied, the UE receives all the broadcasts 1108 for the services associated with the filter information. For example, assume there are services A, B, and C, and that filter information is associated with service C. When criteria associated with the filter information are satisfied, the UE receives all the broadcasts associated with service C.

If the filter information is associated with individual content items (i.e., the filter information is at the content level rather than the service level), when the UE 1102 receives a broadcast 1108, the UE 1102 determines the identifier associated with the received broadcast 1108, and looks up the identifier for a received broadcast 1108 in the target location description metadata fragment 1115. If the filter information includes target location information, the UE 1102 determines a target area associated with the received broadcast 1108. Based on the target area, the UE 1102 determines whether criteria associated with the target area are satisfied. If the criteria are satisfied, the UE 1102 keeps the received broadcast 1108 in order to provide information related to the broadcast 1108 to the user of the UE 1102 (1110). Otherwise, if the criteria are unsatisfied, the UE 1102 deletes the received broadcast 1108 without providing information related to the broadcast 1108 to the user of the UE 1102 (1110).

In order to determine whether the criteria are satisfied, the UE 1102 determines its location. The location may be a previous location, a current location, or a predictive future location. Similar to the exemplary method discussed in relation to FIG. 8, based on the determined location, the UE 1102 can determine whether the criteria are satisfied. The filter description metadata fragment 1115 may further include a time associated with the target area. In such a configuration, the criteria are associated with the time. For example, the filter description metadata fragment 1115 may include a duration, a start time, and an end time, and the criteria may be satisfied if the UE 1102 has previously been located or is currently located within the target area for a time period greater than or equal to the duration between the start time and the end time. If the filter description metadata fragment 1115 includes only a start time and end time, but not a duration, the criteria may be satisfied if the UE 1102 has previously been located or is currently located within the target area between the time starting at the start time and the time ending at the end time. The filter description metadata fragment 1115 may further include a present level of confidence that the UE 1102 has been located, is located, or will be located in the target area based on the time and an absent level of confidence that the UE 1102 has not been located, is not located, or will not be located in the target area based on the time. The present level of confidence is a level of confidence of a previous presence, a current presence, or a future presence that the UE 1102 is in the target area. The absent level of confidence is a level of confidence that the UE 1102 was previously absent, is currently absent, or will be absent from the target area. The criteria may be associated with the present level of confidence and the absent level of confidence. The present level of confidence and the absent level of confidence may be useful in determining whether the UE 1102 is likely to be within the target area within a future time period. When the UE 1102 is likely to be within the target area within a future time period, and that likelihood is greater than the present level of confidence and/or the unlikelihood is less than the absent level of confidence, the criteria may be satisfied such that a broadcast associated with the target area may be processed and information associated with the broadcast provided to a user of the UE 1102.

The target area within the filter description metadata fragment 1115 may be one or more target areas. Each of the target areas may be a cell identifier associated with a particular eNB; an identifier defining boundaries of a physical area, such as a zip code or a county name; or otherwise data defining boundaries of a physical area, such as a radius and a latitude and a longitude, a plurality of latitudes and longitudes, street names, and the like. The user service bundle description 1106 and the filter description metadata fragment 1115 may be received in a FLUTE service announcement session. The filter description metadata fragment 1115 may further include at least one additional target area and logical operators. In such a configuration, the satisfaction of the criteria is based on said target area and said at least one additional target area as a function of the logical operators. By including additional target areas and logical operations, the criteria may be satisfied, for example, if the UE 1102 is within the target area X or the target area Y for the requisite duration during the specified time period.

The filter description metadata fragment 1115 may further include a time at which particular broadcasts will be transmitted (e.g., transmission schedule). When the filter description metadata fragment 1115 includes a time at which a particular broadcast will be transmitted, the UE 1102 is able to determine when the particular broadcast will be transmitted and ignore the broadcast (e.g., turn off its receiver or refrain from turning on its receiver) based on whether criteria are unsatisfied. Accordingly, the UE 1102 enters into a service announcement session with a BM-SC 1103 through an eNB 1104. During the session, the UE 1102 receives the user service bundle description 1106 and the filter description metadata fragment 1115. The filter description metadata fragment 1115 may include a target area associated with a broadcast and a time at which the broadcast will be transmitted. The UE 1102 determines its location and whether criteria are satisfied based on whether the determined location is within the target area (1112). If the criteria are satisfied, the UE 1102 enters into a user-data session with a BM-SC 1103 through an eNB 1104 and receives the broadcast 1108. If the criteria are unsatisfied, the UE 1102 turns off its receiver or refrains from turning on its receiver so as not to receive the broadcast 1108 or otherwise ignores the broadcast 1108 by refraining from decoding or further decoding the broadcast 1108.

Location-based targeting of broadcast services may be enabled through filter description metadata associated with the user service bundle description 1106. The user service bundle description 1106 is described infra in relation to FIG. 12 and FIG. 13.

Figure 12:
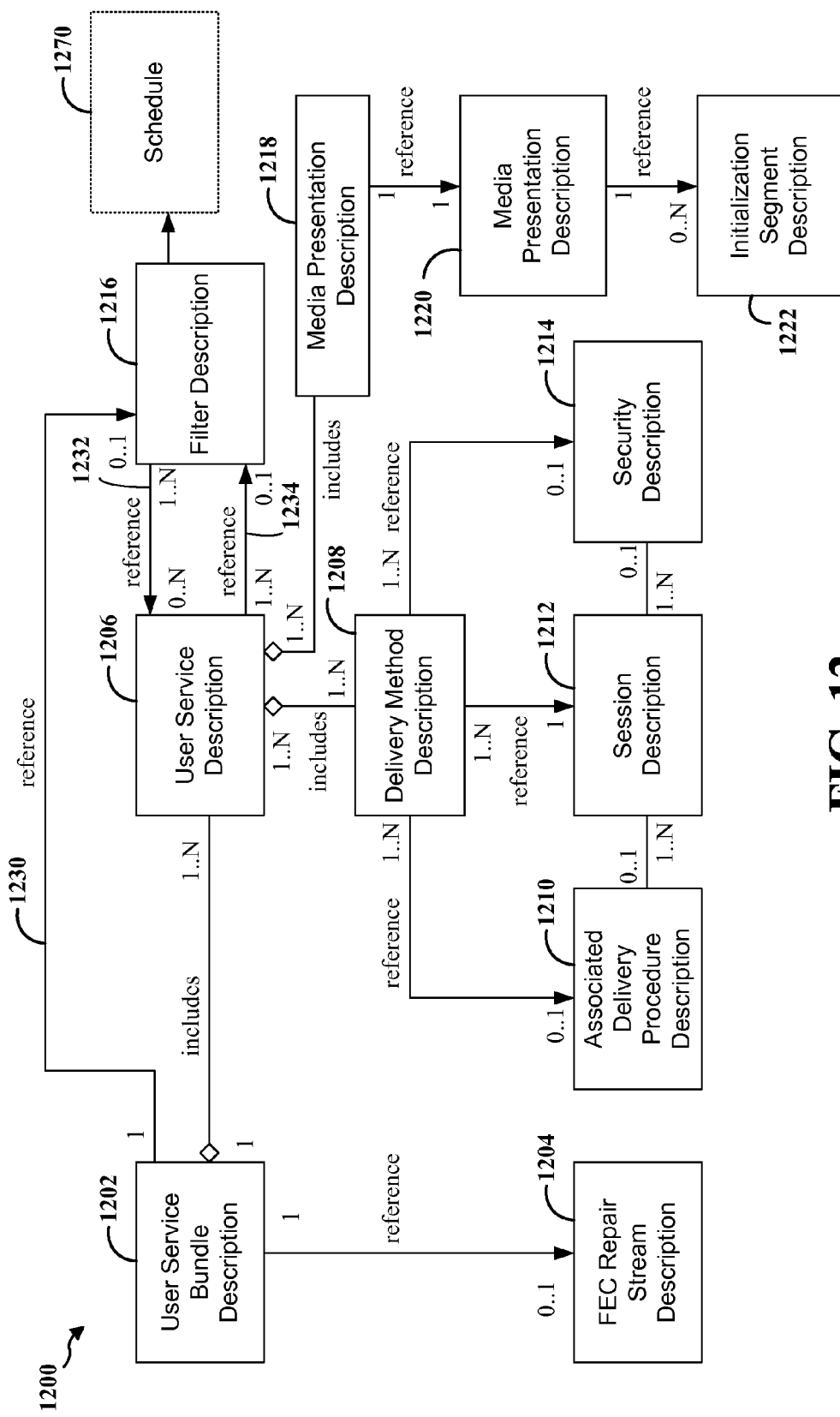
FIG. 12 is a diagram illustrating a first exemplary user service bundle description.

FIG. 12 is a diagram 1200 illustrating a first exemplary user service bundle description 1202. The MBMS user service bundle description 1202 includes at least one user service description instance 1206 and may refer to a forward error correction (FEC) repair stream description 1204. The user service description instance 1206 includes at least one delivery method description instance 1208 and at least one media presentation description instance 1218. The at least one delivery method description instance 1208 refers to one session description instance 1212, may refer to an associated delivery procedure description instance 1210, and may refer to a security description instance 1214. The at least one media presentation description instance 1218 refers to one media presentation description instance 1220, which itself may refer to one or more initialization segment description instances 1222. The user service description instance 1206 may refer (1234) to at least one filter description instance 1216. Each filter description instance 1216 may itself refer (1232) to at least one user service description instance 1206. Further, the user service bundle description 1202 may refer (1230) to the filter description instance 1216.

When the filter description instance 1216 applies to all services associated with the user service bundle description 1202, the user service bundle description 1202 may include a reference 1230 to the filter description instance 1216. The user service bundle description 1202 includes a user service description instance 1206 for each service associated with the user service bundle description 1202. A particular user service description instance 1206 may refer 1234 to a filter description instance 1216 so that the target location(s) associated with the filter description instance 1216 applies to all content for the particular user service description instance 1206. When the filter description instance 1216 applies to an individual content item for a particular service, the filter description instance 1216 includes one or more references 1232 to particular user service description instances 1206 and includes identifiers associated with each of the individual content items. This means the same location criteria present in the filter descriptor instance 1216 applies to the named content identifier in each of the referenced user service description instances 1206.

As discussed supra, the filter description instance 1216 may provide location target information for all services associated with the user service bundle description 1202, for all content associated with a particular user service description instance 1206, or for one or more individual content items associated with the user service description instances 1206. When the filter description instance 1216 provides content level location target information, the filter description instance 1216 may further include a transmission schedule with transmission times of the associated broadcasts. Alternatively, the filter description instance 1216 may reference the transmission schedule 1270. The filter description instance 1216 may additionally or alternatively include user profile or preference information, device profile data, or application-specific attributes.

Alternatively, the filter information may be included in the session description instance 1212. Regardless of whether filter information is placed in the filter description or the session description, the UE may need a means to know when to monitor the broadcast user service announcement channel for such updates. This could be done by employing a separate, dedicated broadcast notification channel which provides notice of location targeting, and or other service updates, to service announcement information. The UEs can be expected to constantly monitor such notification channel. Alternatively, expiration time is defined for a service announcement metadata fragment. In the case of the filter description fragment, that is given by its "validity time" parameter. In the case of a session description instance, the expiration of its validity is given by the stop-time of the "t=" line in the SDP-based description.

Given the existence of session description information, and assuming the use of the session description protocol (SDP) syntax for their representation, SDP attributes can be extended to include location targeting parameters. The attributes mechanism ("a="), the primary extension mechanism for SDP, may be used to tailor SDP for particular applications or media. Support for location targeting may be provided through extension of the Session Description of MBMS USD/A metadata fragments.

The designated extension mechanism in SDP as indicated above may be via the attribute mechanism, and may be applicable to the session-level or media-level attributes, or both. In one aspect, only the session-level attributes apply. Three attribute extensions may be defined.

(1) The first attribute extension may define, in the case of broadcast download (i.e. file) delivery and whereby the session description pertains to a FLUTE/ALC session, a list of identifiers for one or more content items, or files carried in the FLUTE session. The following syntax may represent such content identification using the SDP attribute mechanism:

a=content-id:<number-content-items><content_id-1> . . . <content_id-N>

<number-content-items> indicates the number of content items delivered during this FLUTE session. Value of 0 signifies that the location filter defined in this session description pertains to the entire service as opposed to individual content items.

<content_id-X> is an alphanumeric string representing the content identifier for the purpose of associating the per-content location filter to that content item.

(2) The second extension may define an attribute that conveys location info for a component location filter. The value parameter of the "a=<attribute>:<value>" structure comprises an N-tuple set of values that represents the location filter identity and criteria. In particular, the following syntax may be used to represent a component location filter using the SDP attribute mechanism:

a=componentlocationfilter:<locfilter-id><target area-type><target area><start-time><end-time><confidence level>/<keyword>

Attribute name componentlocationfilter signifies the representation of a component location filter as represented by the value of this attribute.

<locfilter-id> identifies the component location filter in constructing the overall location filter.

<target area-type> is a text string that defines the type of location information in <target area>. Three values are defined in this IDF: "cellID", "zipcode" and "ellipsoid point with uncertainty radius".

<target area> is an alphanumeric string representation of the indicated target area-type:

For (target area-type>=cellID, Cell Identity (CI) or Cell Global Identification (CGI) is used in the case of 3GPP cell identifiers; other notations apply for non-3GPP cell identifiers;

5-digit zip code, or 9-digit zip+4 code;

Comma-separated values (CSV) comprising the (lat, long) coordinates of an ellipsoid point (the origin) and a radius, "r".

<start-time> is the NTP timestamp representing the start of a time period for evaluation of the location filter.

<end-time> is the NTP timestamp representing the end of a time period for evaluation of the location filter.

<confidence level>/<keyword> is the pairing of two sub-attributes. The first entry represents the target level of confidence that the UE had been located, is located, or will be located in the target area based on the time duration. The value range of this parameter ranges from 0 to 1. The second entry is given by either the word present or absent, signifying the presence or absence state of the UE for which the confidence level metric in relation to the target location and time parameters is to be applied.

One or more of the locationfilter attribute lines may be present in the SDP, each defining a unique set of location targeting parameters given by the value of the attribute. The description below explains the usage when multiple location filter entries appear in the SDP.

(3) The third attribute extension may signal the overall location filter at either the service level, or at the individual content item level. Using the "a=<attribute>:<value>" notation, <attribute>=locationfilter and <value> comprises an N-tuple of <content-id> and <expression>. <content-id> with non-zero value identifies the content item for which the overall location filter applies, and <expression> is the logical combination of one or more component location filters that defines the overall location targeting information for the associated content item. <content-id> with value zero identifies the service to which the overall location filter applies.

Limited capability can be provided using SDP syntax to define location targeting by individual content items of a broadcast service. This would make use of the nominal timing parameter of SDP, e.g., the "t=" line. The nominal syntax of the timing parameter may be given by: t=<start-time><stop-time>, whereby the "t=" lines specify the start and stop times for a session, and multiple such lines may be used to denote a session being active at multiple irregularly-spaced time intervals, with each additional "t=" line specifying an additional period of time for which the session will be active.

The above inherent timing capability in SDP can be used such that each "t=" line is defined as the transmission time of one of the content items in the parent service. For example, a broadcast ad service containing 10 different ads sent at different times would have 10 "t=" lines in the SDP, each line defining the specific transmission schedule of one of the ads. Such use of the timing parameter in SDP represents the exact and unique time interval that the UE can expect to receive the broadcast transmission of a content item, meaning that it should be ready to do so if required, and can immediately power down afterwards, and remain that way as long as subsequent content items are not of interest from location filtering perspective. To establish the special meaning of these "t=" lines, each instance of the parent service may be associated with a unique and dedicated session (for example, a FLUTE session for download delivery based service). In other words, this broadcast service may not be sent on a FLUTE session shared with other broadcast services. Furthermore, in combination with the previously-described location filters and (optional) logical operations on those filters, each location-specific content item may be tagged with a specific delivery window as well as location filter rule. An example SDP description that supports location targeting may be represented as indicated:

```
v=0
o=user123 2890844526 2890842807 IN IP6 2201:056D::112E:144A:1E24
s=Location-based Ad Service X
i=Broadcast Ad service whose 10 contents are location specific, and whose
successive delivery times are separated by an increasing during of
(30 + n*5) minutes, where n corresponds to the instance of the content,
and each ad is transmitted for exactly 4 seconds
t=3530822400 3530822404
t=3530824200 3530824204
t=3530826300 3530826304
t=3530828700 3530828704
t=3530831400 3530831404
t=3530834400 3530834404
t=3530837700 3530837704
t=3530841300 3530841304
t=3530845200 3530845204
t=3530849400 3530849404
a=mbms-mode:broadcast 1234 1
a=FEC-declaration:0 encoding-id=1
a=source-filter: incl IN IP6 * 2001:210:1:2:240:96FF:FE25:8EC9
a=flute-tsi:3
m=application 12345 FLUTE/UDP 0
c=IN IP6 FF1E:03AD::7F2E:172A:1E24/1
b=64
a=lang:EN
a=FEC:0
a=locationfilter:cellID 901088AB12_{hex}3456_{hex} 3529612800 3529616400
0.6/present
a=locationfilter:cellID 901088AB12_{hex}3456_{hex} 3530217600 3530221200
0.6/present
a=locationfilter:cellID 901088AB12_{hex}789A_{hex} 3530217600 3530221200
0.7/absent
a=logical-operator:||,&&
```

One further limitation of using the SDP to convey location targeting as described above may be that the transmission schedule of the individual contents of the location-based service remains fixed for the validity duration of the SDP description, once it has been sent to the UE as USD/A metadata. It may not be feasible to change the SDP description afterwards, since re-sending the Session Description fragment necessitates resending other metadata fragments, which would be network resource/bandwidth inefficient.

Figure 13:
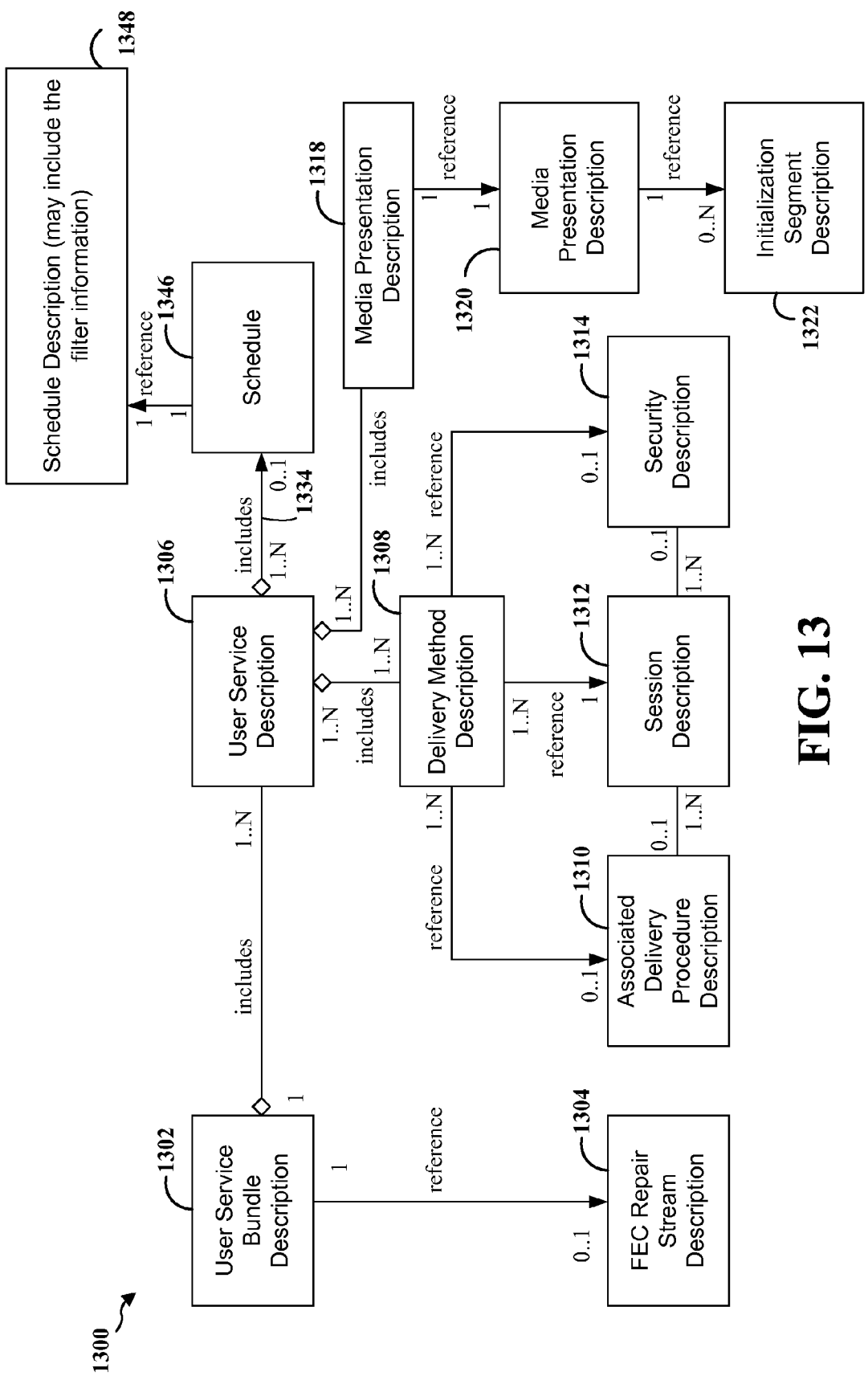
FIG. 13 is a diagram illustrating a second exemplary user service bundle description.

FIG. 13 is a diagram 1300 illustrating a second exemplary user service bundle description 1302. The MBMS user service bundle description 1302 includes at least one user service description instance 1306 and may refer to an FEC repair stream description 1304. The user service description instance 1306 includes at least one delivery method description instance 1308, at least one media presentation description instance 1318, and may include one schedule instance

1346. The at least one delivery method description instance 1308 refers to one session description instance 1312, may refer to an associated delivery procedure description instance 1310, and may refer to a security description instance 1314. The at least one media presentation description instance 1318 refers to one media presentation description instance 1320, which itself may refer to one or more initialization segment description instances 1322. The schedule instance 1346 refers to a schedule description instance 1348. The schedule description instance 1348 may include the filter information.

Figure 14:
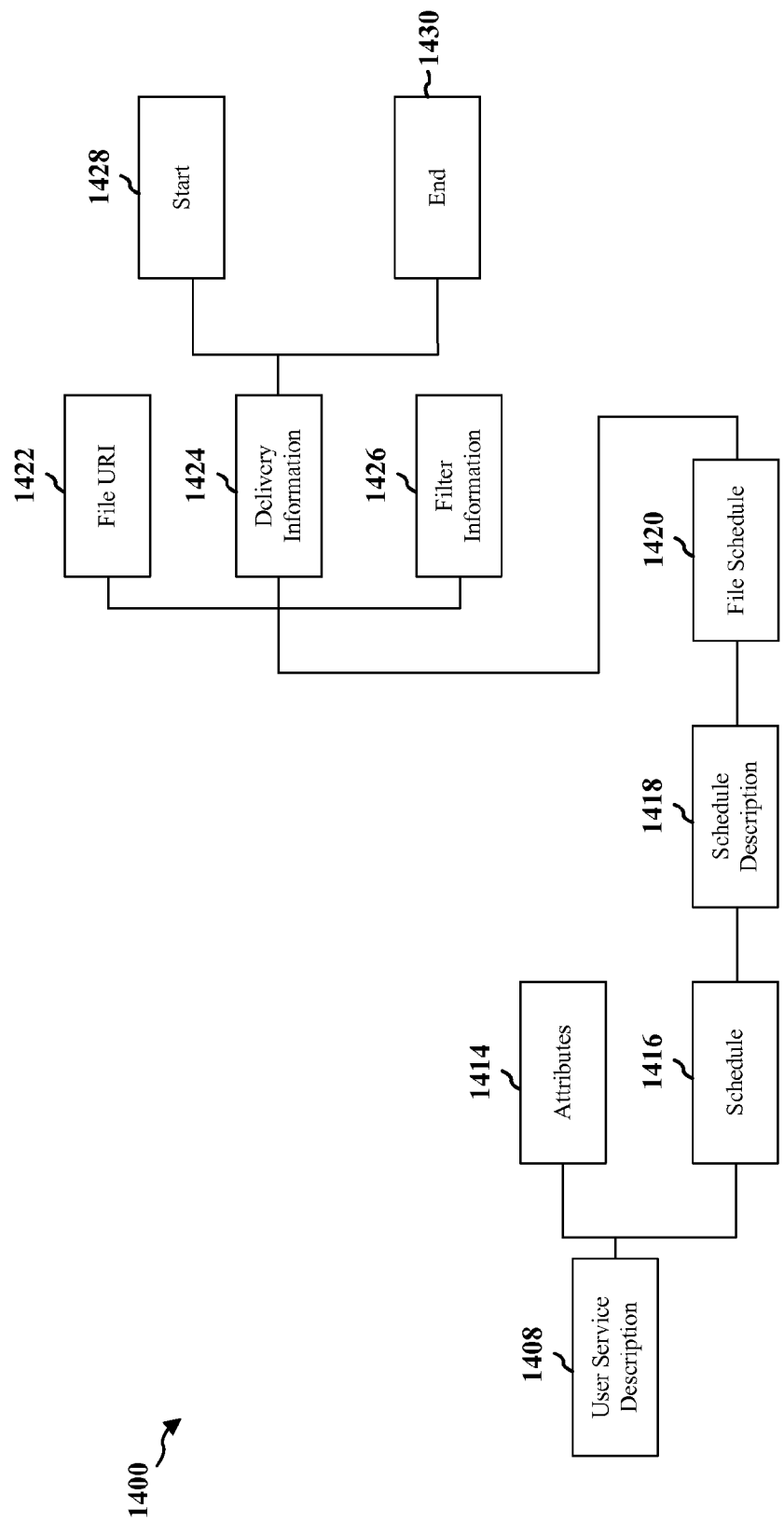
FIG. 14 is a diagram illustrating a schedule element under a user service description.

FIG. 14 is a diagram 1400 illustrating a schedule element under a user service description. A user service description 1408 may include attributes 1414 and a schedule 1416. The schedule 1416 may include a schedule description 1418, which may include a file schedule 1420. The file schedule 1420 may include a file URI 1422, delivery information 1424, and a filter information 1426. The delivery information 1424 may include a start time 1428 and an end time 1430.

The schedule description instance may carry the transmission schedule of active sessions of the user service, and in the case of a file download service, individual file objects belonging to the associated user service. The announced transmission schedule corresponds to files of a download delivery service. The UE may choose certain file(s) to receive based on the file delivery schedule and affiliated auxiliary information in the schedule description instance. The file schedule information is defined by the start and end transmission times for individual content files of the service identified by its file URI. Additional filtering metadata may include a description of the content file associated with the schedule. For the purposes of supporting selective download of a location-dependent file download service, auxiliary filtering information may be target location information.

Figure 15:
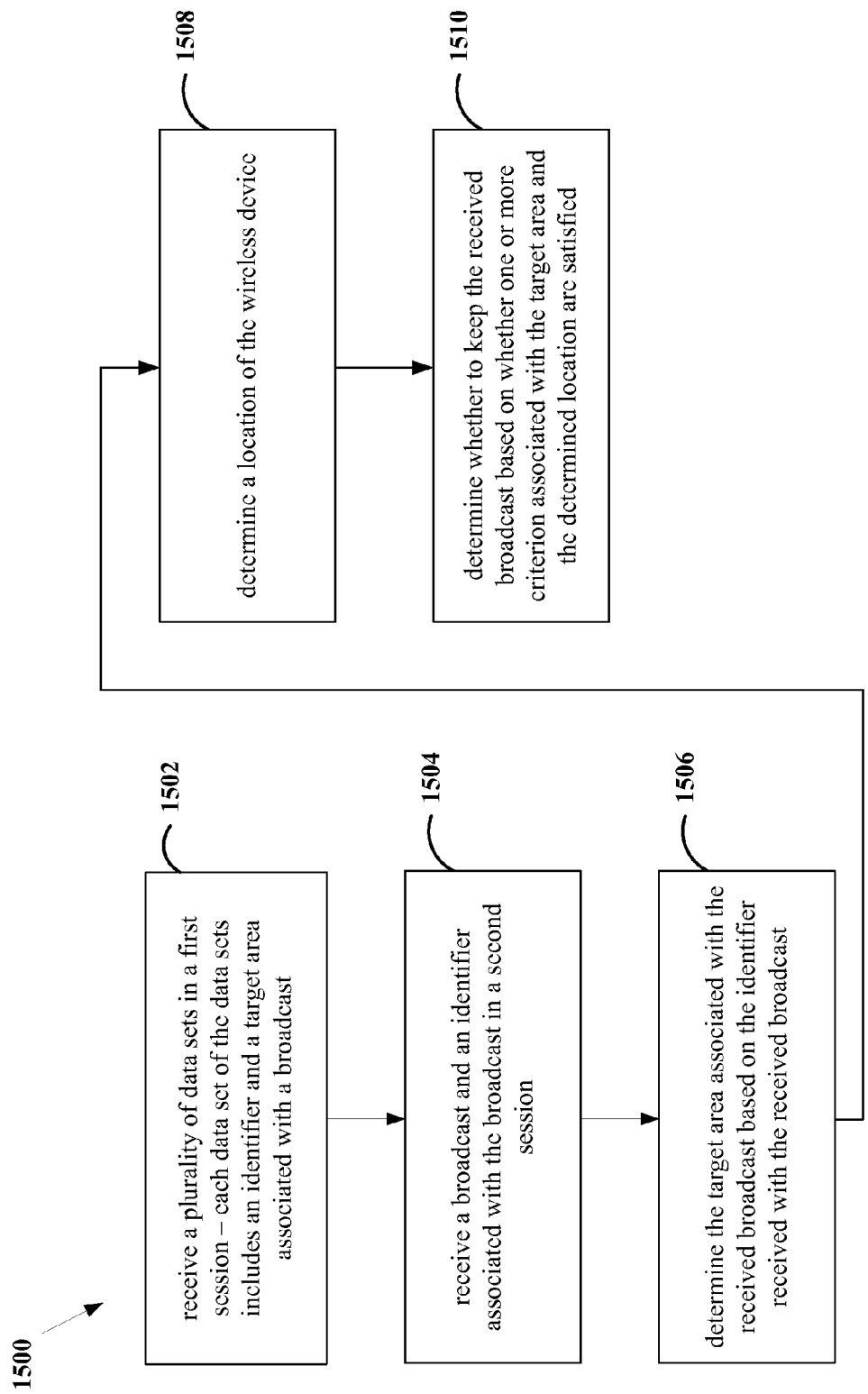
FIG. 15 is a flow chart of a first method of wireless communication.

FIG. 15 is a flow chart 1500 of a first method of wireless communication. The method is performed by a wireless device, such as the UE 702/1102. According to the method, in step 1502, the UE receives a plurality of data sets in a first session (e.g., user data session or service announcement session). Each data set of the data sets includes an identifier and a target area associated with a broadcast. In step 1504, the UE receives a broadcast and an identifier associated with the broadcast in a second session. In step 1506, the UE evaluates the target area, or location filtering rule, associated with the received broadcast based on the identifier received with the received broadcast against related internal knowledge. In step 1508, the UE determines a previous location, a current location, or a predictive future location of the UE. In step 1510, the UE then determines whether to keep the received broadcast based on whether one or more criterion associated with the target area and the determined location are satisfied.

For example, as discussed supra in relation to FIG. 7, the UE 702 may receive a broadcast file 708 and an identifier associated with the broadcast file. The UE 702 looks up the identifier for the received broadcast file in the filter information and may determine a target area associated with the received broadcast file. The UE determines a previous, current, or future location of the UE. Accordingly, based on the target area and the determined location, the UE 702 determines whether one or more criterion associated with the target area and the determined location are satisfied. If the criteria are satisfied, the UE 702 keeps the received broadcast file 708 in order to provide information related to the broadcast file 708 to the user of the UE 702. Otherwise, if the criteria are unsatisfied, the UE 702 deletes the received broadcast file 708 without providing information related to the broadcast file 708 to the user of the UE 702.

As described supra, each data set may include an identifier and a target area. Each data set may further include at least one content reference indicating at least one content for which the data set applies. In one configuration, each data set includes additional parameters, such as a start time, an end time, a duration, a level of confidence the UE is present in the target area for the duration between the start and end times, and/or a level of confidence the UE is absent from the target area for the duration between the start and end times. In one configuration, the UE may determine a previous location, a current location, or a predictive future location of the UE. In such a configuration, the criteria evaluation may be based on whether the previous location, the current location, or the predictive future location is within the target area. Each data set may further include a time associated with the target area, and the criteria may be associated with the time. In one configuration, each data set may further include a duration, the time includes a start time and an end time associated with the target area, and the criteria may be satisfied when the UE has previously been located, is located, or will be located in the target area for a time greater than or equal to the duration between the start time and the end time. In such a configuration, each data set may further include a present level of confidence that the UE has been located, is located, or will be located in the target area based on the time and an absent level of confidence that the UE has not been located, is not located, or will not be located in the target area based on the time. In such a configuration, the criteria are associated with the present level of confidence and the absent level of confidence. The present level of confidence and the absent level of confidence that the UE will be located within the target area for the specified duration may be based on previous history of the UE and/or a comparison of current events to previous events in which the UE was in the target area.

The target area may be a cell identifier, an identifier defining boundaries of a physical area (e.g., zip code, county name), or data defining boundaries of a physical area (e.g., latitude, longitude, radius, street names, or other data parameters defining a physical boundary). In a first configuration, the first and second sessions may be the same FLUTE user-data session, the plurality of data sets may be included in an FDT instance or may be mapped to FLUTE packets, and the identifier may be a transmission object identifier (TOI). In a second configuration, the first session may be a FLUTE service announcement session and the second session may be a FLUTE user-data session. In the second configuration, the plurality of data sets may be received in one or more metadata fragment instances associated with a user service bundle description 1106/1202/1302 during an MBMS user service discovery/announcement. In one sub-configuration, the one or more metadata fragment instances may include a filter description instance (e.g., 1216, 1426) associated with the user service bundle description 1106/1202/1302. The filter description instance may belong to a schedule instance associated with the user service bundle description. In another sub-configuration, the one or more metadata fragment instances may include a session description instance 1212 associated with the user service bundle description 1106/1202. Each data set may further include at least one additional target area and logical operators (e.g., AND, OR, NOT), and the satisfaction of the criteria may be based on the target area and the at least one additional target area as a function of the logical operators. The received broadcast may be a portion of an entire broadcast. In such a configuration, the UE may determine whether to receive a remaining portion of the entire broadcast based on whether the criteria associated with the target area are satisfied.

Figure 16:
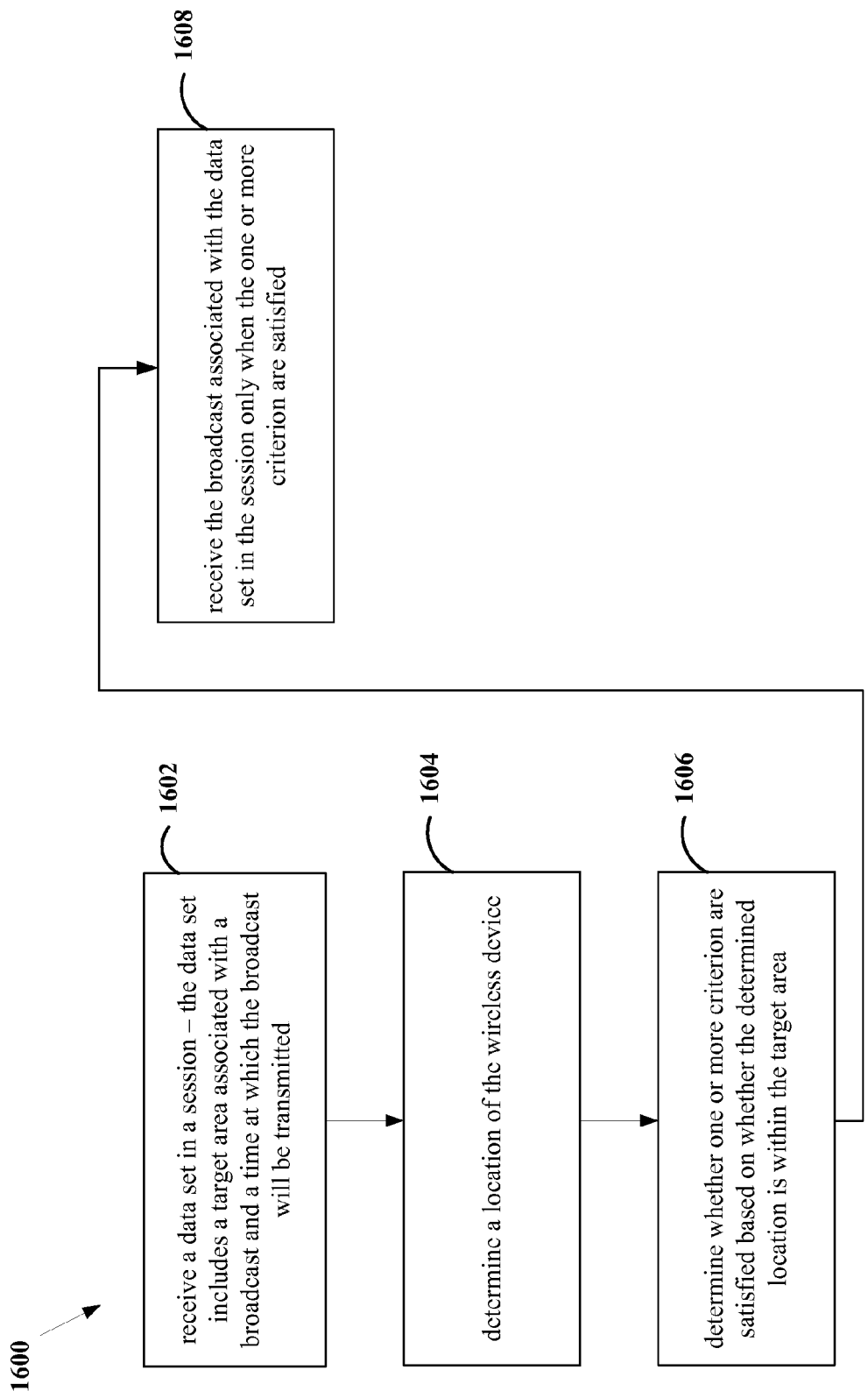
FIG. 16 is a flow chart of a second method of wireless communication.

FIG. 16 is a flow chart 1600 of a second method of wireless communication. The method is performed by a wireless device, such as the UE 702/1102. According to the second method, in step 1602, the UE receives a data set in a session. The data set includes a target area associated with a broadcast and a time at which the broadcast will be transmitted. In step 1604, the UE determines its location. In step 1606, the UE determines whether one or more criterion is satisfied based on whether the determined location is within the target area. In step 1608, the UE receives the broadcast associated with the data set in the session only when the one or more criterion are satisfied. As such, when the one or more criterion is unsatisfied, the UE refrains from receiving the broadcast.

Each data set may further include at least one content reference indicating at least one content for which the data set applies. In one configuration, the location is a previous location, a current location, or a predictive future location of the UE, and the criteria evaluation is based on whether the previous location, the current location, or the predictive future location is within the target area. In one configuration, the data set further includes a time associated with the target area, and the criteria are associated with the time. In one configuration, the data set further includes a duration, the time includes a start time and an end time associated with the target area, and the criteria are satisfied when the UE has previously been located or is located in the target area for a time greater than or equal to the duration between the start time and the end time. In another configuration, the data set further includes a present level of confidence that the UE has been located, is located, or will be located in the target area based on the time and an absent level of confidence that the UE has not been located, is not located, or will not be located in the target area based on the time, and the criteria are associated with the present level of confidence and the absent level of confidence.

In one configuration, the target area is a cell identifier, an identifier defining boundaries of a physical area, or data defining boundaries of a physical area. In a first configuration, the session is a FLUTE user-data session and the data set may be included in an FDT instance or is mapped to one or more FLUTE packets. In a second configuration, the session is a FLUTE service announcement session. In the second configuration, the data set may be received in one or more metadata fragment instances associated with a user service bundle description 1106/1202/1302 during an MBMS user service discovery/announcement. In one sub-configuration, the one or more metadata fragment instances may include a filter description instance (e.g., 1216, 1426) associated with the user service bundle description 1106/1202/1302. The filter description instance may belong to a schedule instance associated with the user service bundle description. In another sub-configuration, the one or more metadata fragment instances may include a session description instance 1212 associated with the user service bundle description 1106/1202. In one configuration, the data set further includes at least one additional target area and logical operators, and the satisfaction of the criteria is based on said target area and said at least one additional target area as a function of the logical operators.

Figure 17:
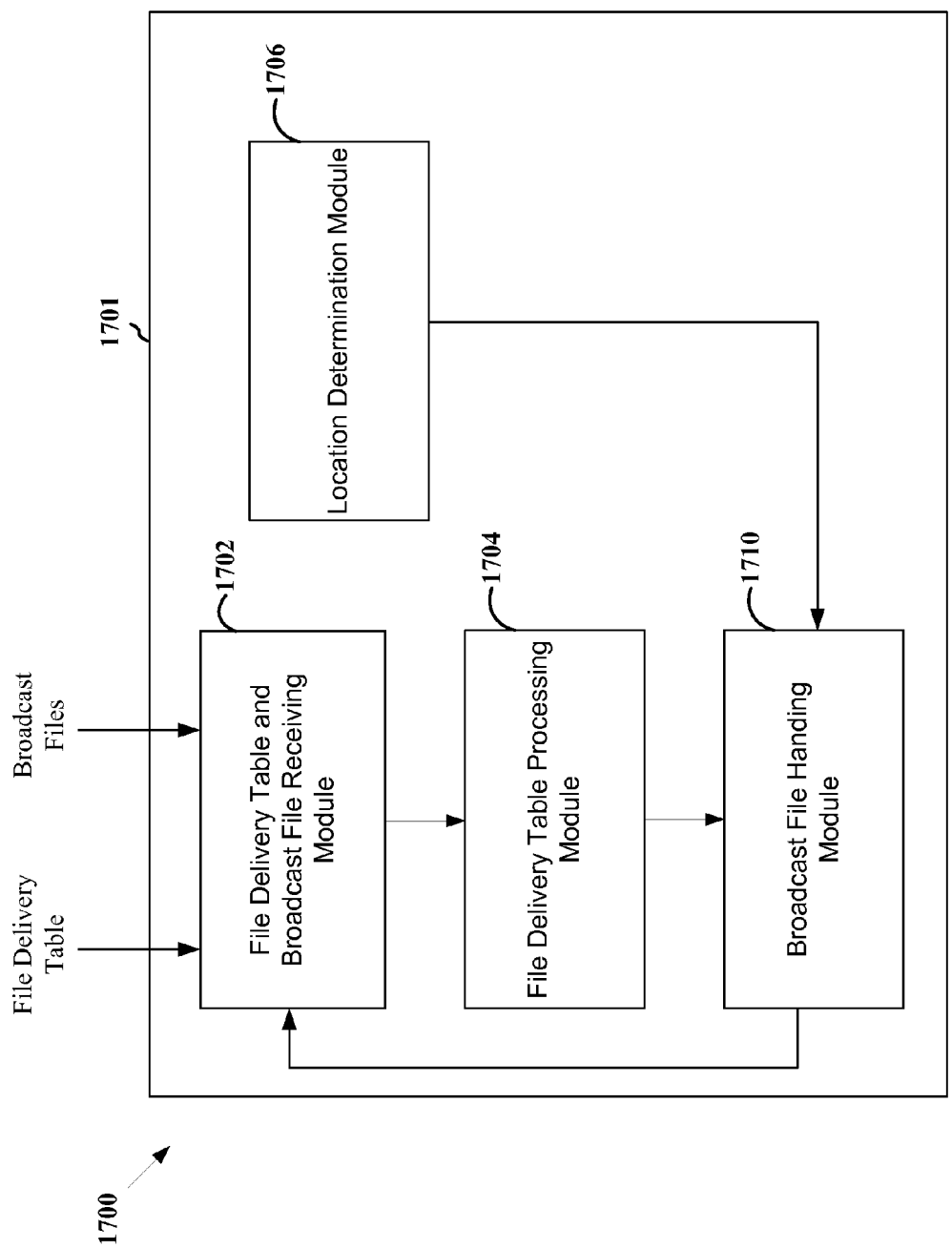
FIG. 17 is a conceptual data flow diagram illustrating the data flow between different modules/means/components in a first exemplary apparatus.

FIG. 17 is a conceptual block diagram 1700 illustrating the functionality of an exemplary apparatus 1701. The apparatus includes an FDT and broadcast receiving module 1702 that is configured to receive FDT instances and broadcast files. In a first configuration, the FDT and broadcast file receiving module 1702 may be configured to receive a plurality of data sets in a session. Each data set of the data sets includes an identifier and a target area associated with a broadcast file. In addition, the FDT and broadcast file receiving module 1702 may be configured to receive a broadcast file and an identifier associated with the broadcast file in the session. The apparatus further includes a file delivery table processing module 1704 that may be configured to determine the target area associated with the received broadcast file based on the identifier received with the received broadcast file. The apparatus further includes a broadcast file handling module 1710 that may be configured to determine whether to keep the received broadcast file based on whether criteria associated with the target area are satisfied. The apparatus may further include a location determination module 1706 that is configured to determine a previous location, a current location, or a future location of the apparatus. The criteria are based on whether the previous location, current location, or future location is within the target area.

The apparatus may include additional modules that perform each of the steps of the algorithm in the aforementioned flow charts of FIG. 15. As such, each step in the aforementioned flow charts of FIG. 15 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

In a second configuration, the FDT and broadcast file receiving module 1702 may be configured to receive a data set in a session. The data set includes a target area associated with a broadcast file and a time at which the broadcast file will be transmitted. The apparatus further includes a location determination module 1706 that may be configured to determine a location of the apparatus. The apparatus further includes a broadcast file handling module 1710 that may be configured to determine whether criteria are satisfied based on whether the determined location is within the target area. The FDT and broadcast file receiving module 1702 may also be configured to receive the broadcast file associated with the data set in the session only when the criteria are satisfied.

The apparatus may include additional modules that perform each of the steps of the algorithm in the aforementioned flow charts of FIG. 16. As such, each step in the aforementioned flow charts of FIG. 16 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 18:
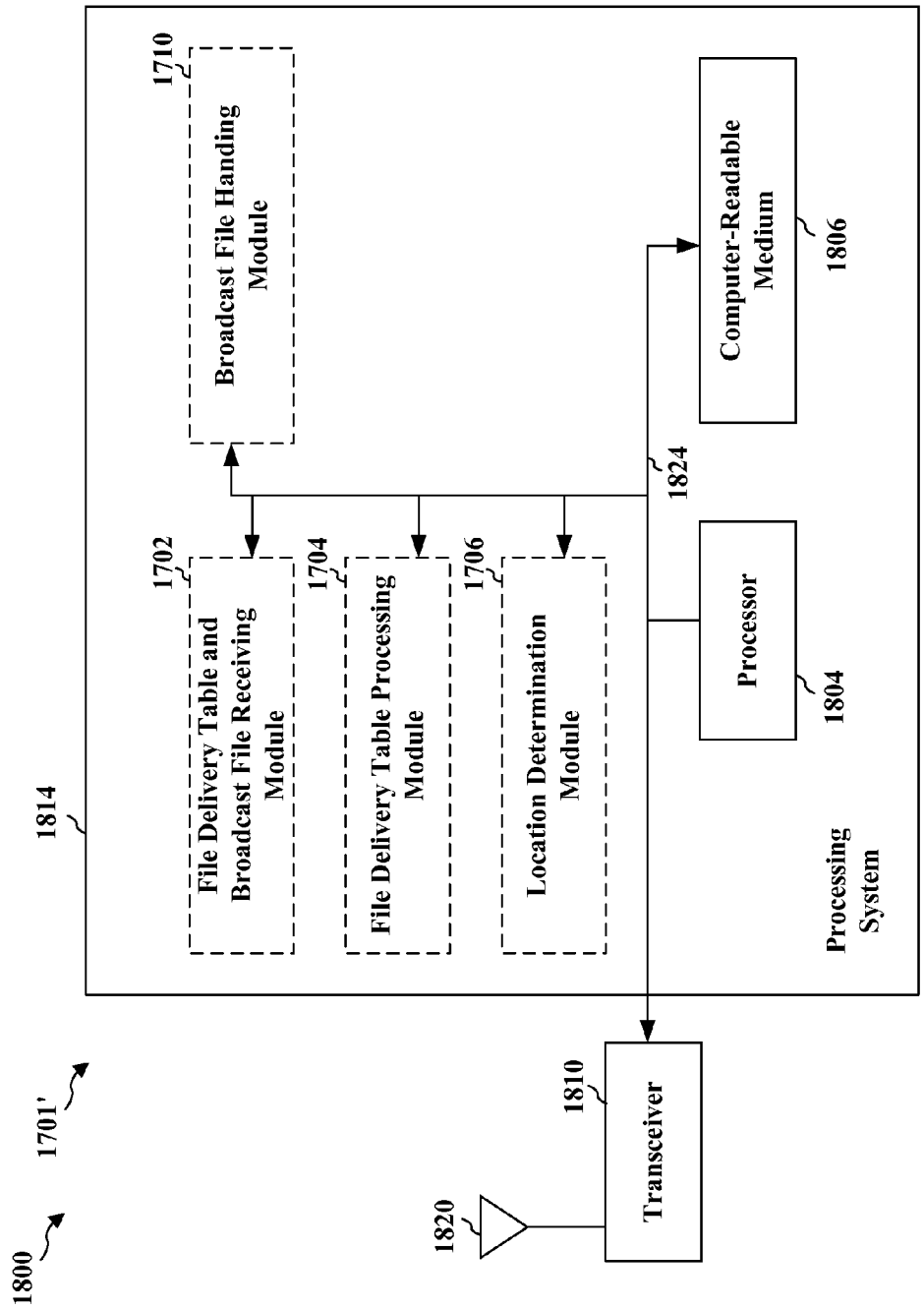
FIG. 18 is a diagram illustrating an example of a hardware implementation for a first apparatus employing a processing system.

FIG. 18 is a diagram illustrating an example of a hardware implementation for an apparatus 1701' employing a processing system 1814. The processing system 1814 may be implemented with a bus architecture, represented generally by the bus 1824. The bus 1824 may include any number of interconnecting buses and bridges depending on the specific application of the processing system 1814 and the overall design constraints. The bus 1824 links together various circuits including one or more processors and/or hardware modules, represented by the processor 1804, the modules 1702, 1704, 1706, 1710, and the computer-readable medium

1806. The bus 1824 may also link various other circuits such as timing sources, peripherals, voltage regulators, and power management circuits, which are well known in the art, and therefore, will not be described any further.

The processing system 1814 may be coupled to a transceiver 1810. The transceiver 1810 is coupled to one or more antennas 1820. The transceiver 1810 provides a means for communicating with various other apparatus over a transmission medium. The processing system 1814 includes a processor 1804 coupled to a computer-readable medium 1806. The processor 1804 is responsible for general processing, including the execution of software stored on the computer-readable medium 1806. The software, when executed by the processor 1804, causes the processing system 1814 to perform the various functions described supra for any particular apparatus. The computer-readable medium 1806 may also be used for storing data that is manipulated by the processor 1804 when executing software. The processing system further includes at least one of the modules 1702, 1704, 1706, and 1710. The modules may be software modules running in the processor 1804, resident/stored in the computer readable medium 1806, one or more hardware modules coupled to the processor 1804, or some combination thereof. The processing system 1814 may be a component of the UE 650 and may include the memory 660 and/or at least one of the TX processor 668, the RX processor 656, and the controller/processor 659.

In a first configuration, the apparatus 1701/1701' for wireless communication includes means for receiving a plurality of data sets in a first session. Each data set of the data sets may include an identifier and a target area associated with a broadcast. The apparatus further includes means for receiving a broadcast and an identifier associated with the broadcast in a second session, means for determining the target area associated with the received broadcast based on the identifier received with the received broadcast, and means for determining whether to keep the received broadcast based on whether a criterion associated with the target area is satisfied. The apparatus may further include means for determining a previous location, a current location, or a predictive future location of the apparatus. The criterion evaluation may be based on whether the previous location, the current location, or the predictive future location is within the target area.

In one configuration, the first FLUTE session and the second FLUTE session may be the same session and the same session may be a FLUTE user-data session. The plurality of data sets may be in auxiliary data FLUTE packets and the identifier may be a TOI. The apparatus may further include means for receiving metadata in a FLUTE service announcement session. The metadata provides information for finding the plurality of the data sets in the auxiliary data FLUTE packets. The received broadcast may be a portion of an entire broadcast. In such a configuration, the apparatus may further include means for determining whether to receive a remaining portion of the entire broadcast based on whether the criterion associated with the target area is satisfied.

In a second configuration, the apparatus 1701/1701' for wireless communication includes means for receiving a data set in a session. The data set may include a target area associated with a broadcast and a time at which the broadcast will be transmitted. The apparatus may further include means for determining a location of the apparatus, means for determining whether a criterion is satisfied based on whether the determined location is within the target area, and means for receiving the broadcast associated with the data set in the session only when the criterion is satisfied.

The aforementioned means may be one or more of the aforementioned modules of the apparatus 1701 and/or the processing system 1814 of the apparatus 1701' configured to perform the functions recited by the aforementioned means. As described supra, the processing system 1814 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

Figure 19:
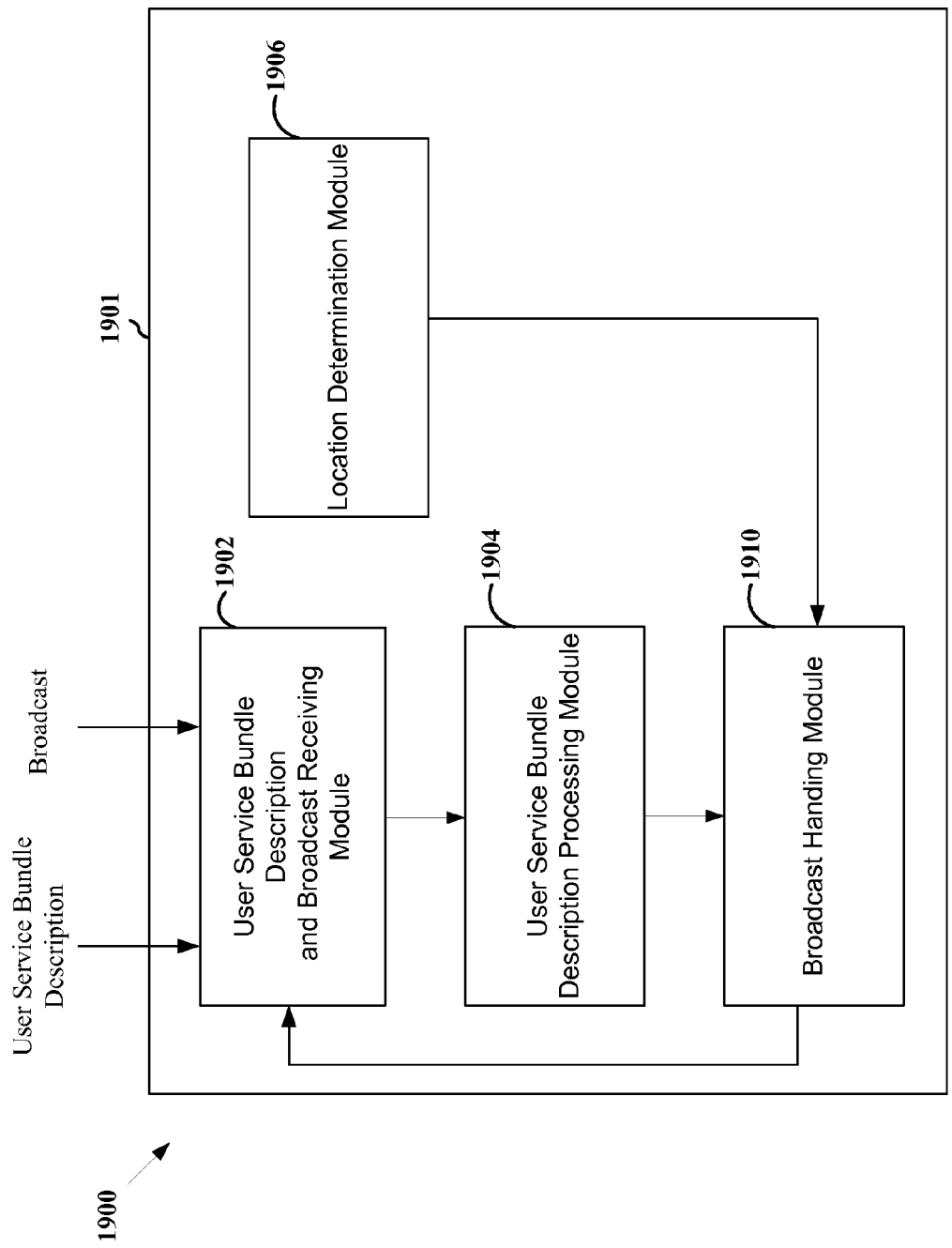
FIG. 19 is a conceptual data flow diagram illustrating the data flow between different modules/means/components in a second exemplary apparatus.

FIG. 19 is a conceptual block diagram 1900 illustrating the functionality of an exemplary apparatus 1901. The apparatus includes a user service bundle description and broadcast receiving module 1902 that may be configured to receive user service bundle descriptions and broadcasts. In a first configuration, the user service bundle description and broadcast receiving module 1902 may be configured to receive a plurality of data sets in a first session. Each data set of the data sets includes an identifier and a target area associated with a broadcast. In addition, the user service bundle description and broadcast receiving module 1902 may be configured to receive a broadcast and an identifier associated with the broadcast in a second session. The apparatus further includes a user service bundle description processing module 1904 that may be configured to determine the target area associated with the received broadcast based on the identifier received with the received broadcast. The apparatus further includes a broadcast handling module 1910 that may be configured to determine whether to keep the received broadcast based on whether criteria associated with the target area are satisfied. The apparatus may further include a location determination module 1906 that is configured to determine a previous location, a current location, or a future location of the apparatus. The criteria are based on whether the previous location, current location, or future location is within the target area.

The apparatus may include additional modules that perform each of the steps of the algorithm in the aforementioned flow chart of FIG. 15. As such, each step in the aforementioned flow chart of FIG. 15 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

In a second configuration, the user service bundle description and broadcast receiving module 1902 may be configured to receive a data set in a session. The data set includes a target area associated with a broadcast and a time at which the broadcast will be transmitted. The apparatus further includes a location determination module 1906 that may be configured to determine a location of the apparatus. The apparatus further includes a broadcast handling module 1910 that may be configured to determine whether criteria are satisfied based on whether the determined location is within the target area. The user service bundle description and broadcast receiving module 1902 may also be configured to receive the broadcast associated with the data set in the session only when the criteria are satisfied.

The apparatus may include additional modules that perform each of the steps of the algorithm in the aforementioned flow chart of FIG. 16. As such, each step in the aforementioned flow chart of FIG. 16 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 20:
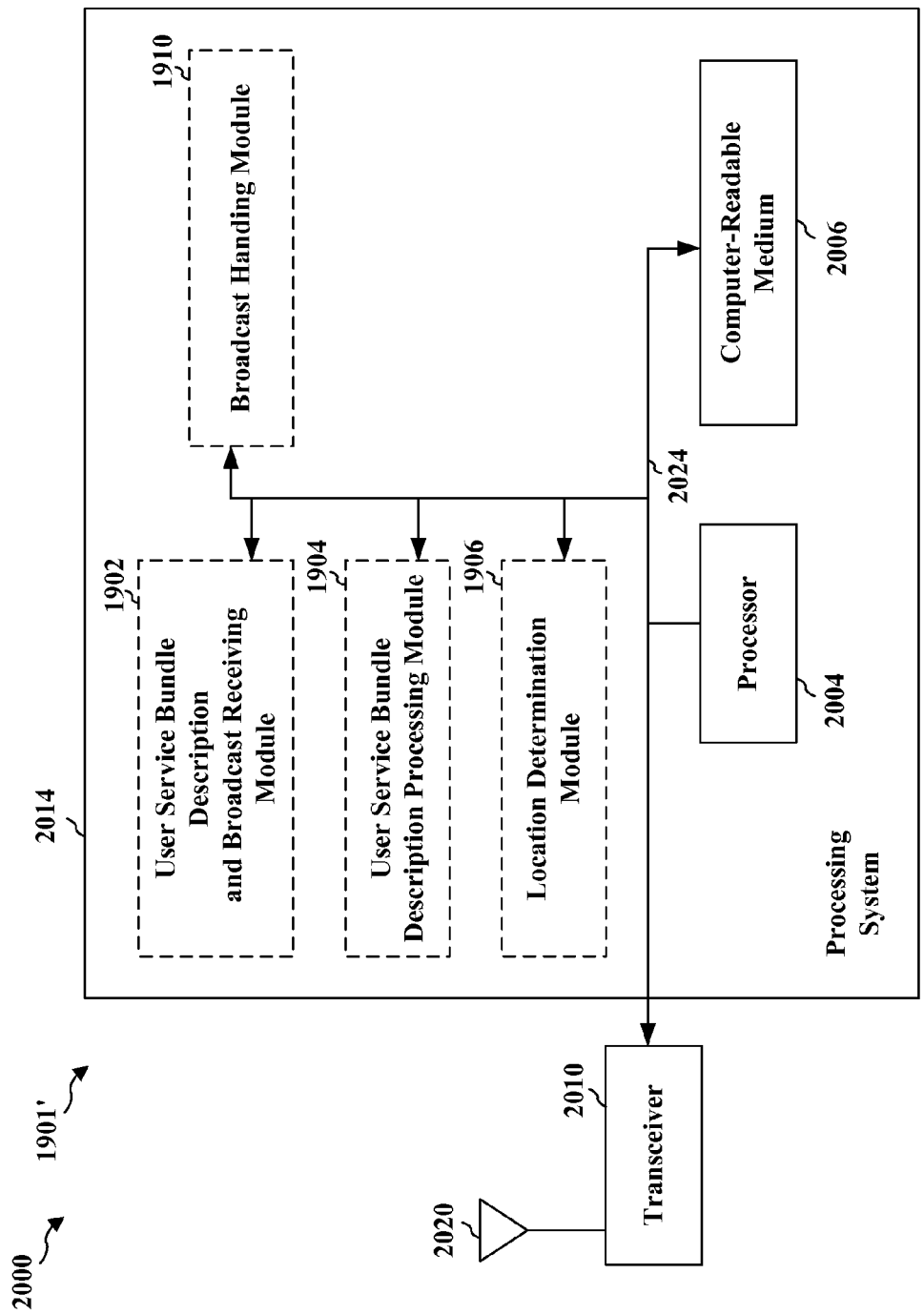
FIG. 20 is a diagram illustrating an example of a hardware implementation for a second apparatus employing a processing system.

FIG. 20 is a diagram illustrating an example of a hardware implementation for an apparatus 1901' employing a processing system 2014. The processing system 2014 may be implemented with a bus architecture, represented generally by the bus 2024. The bus 2024 may include any number of interconnecting buses and bridges depending on the specific application of the processing system 2014 and the overall design constraints. The bus 2024 links together various circuits including one or more processors and/or hardware modules, represented by the processor 2004, the modules 1902, 1904, 1906, 1910, and the computer-readable medium 2006. The bus 2024 may also link various other circuits such as timing sources, peripherals, voltage regulators, and power management circuits, which are well known in the art, and therefore, will not be described any further.

The processing system 2014 may be coupled to a transceiver 2010. The transceiver 2010 is coupled to one or more antennas 2020. The transceiver 2010 provides a means for communicating with various other apparatus over a transmission medium. The processing system 2014 includes a processor 2004 coupled to a computer-readable medium 2006. The processor 2004 is responsible for general processing, including the execution of software stored on the computer-readable medium 2006. The software, when executed by the processor 2004, causes the processing system 2014 to perform the various functions described supra for any particular apparatus. The computer-readable medium 2006 may also be used for storing data that is manipulated by the processor 2004 when executing software. The processing system further includes at least one of the modules 1902, 1904, 1906, and 1910. The modules may be software modules running in the processor 2004, resident/stored in the computer readable medium 2006, one or more hardware modules coupled to the processor 2004, or some combination thereof. The processing system 2014 may be a component of the UE 650 and may include the memory 660 and/or at least one of the TX processor 668, the RX processor 656, and the controller/processor 659.

In a first configuration, the apparatus 1901/1901' for wireless communication includes means for receiving a plurality of data sets in a first session. Each data set of the data sets may include an identifier and a target area associated with a broadcast. The apparatus further includes means for receiving a broadcast and an identifier associated with the broadcast in a second session, means for determining the target area associated with the received broadcast based on the identifier received with the received broadcast, and means for determining whether to keep the received broadcast based on whether a criterion associated with the target area is satisfied. The apparatus may further include means for determining a previous location, a current location, or a predictive future location of the apparatus. The criterion evaluation may be based on whether the previous location, the current location, or the predictive future location is within the target area. The received broadcast may be a portion of an entire broadcast. In such a configuration, the apparatus may further include means for determining whether to receive a remaining portion of the entire broadcast based on whether the criterion associated with the target area is satisfied.

In a second configuration, the apparatus 1901/1901' for wireless communication includes means for receiving a data set in a session. The data set may include a target area associated with a broadcast and a time at which the broadcast will be transmitted. The apparatus may further include means for determining a location of the apparatus, means for determining whether a criterion is satisfied based on whether the determined location is within the target area, and means for receiving the broadcast associated with the data set in the session only when the criterion is satisfied.

The aforementioned means may be one or more of the aforementioned modules of the apparatus 1901 and/or the processing system 2014 of the apparatus 1901' configured to perform the functions recited by the aforementioned means. As described supra, the processing system 2014 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of a user equipment (UE), comprising:
  receiving a plurality of data sets in a first file delivery over unidirectional transport (FLUTE) session, each data set of the plurality of data sets comprising an identifier, a target area associated with a broadcast, at least one additional target area, and logical operators, wherein the plurality of data sets are received in at least one of: 1) a multimedia broadcast multicast service (MBMS) user service discovery/announcement via application service level signaling, and 2) a logical channel via radio access network level signaling;
  receiving a broadcast and an identifier associated with the broadcast in a second FLUTE session;

determining the target area associated with the received broadcast based on the identifier received with the received broadcast; and determining whether to keep the received broadcast based on whether a criterion associated with the target area is satisfied, wherein satisfaction of the criterion is based on the target area and the at least one additional target area as a function of the logical operators.

2. The method of claim 1, further comprising determining a previous location, a current location, or a predictive future location of the UE, wherein the criterion evaluation is based on whether the previous location, the current location, or the predictive future location is within the target area.

3. The method of claim 1, wherein each data set further comprises at least one content reference indicating at least one content for which the data set applies.

4. The method of claim 1, wherein each data set further comprises a time associated with the target area, and the criterion is associated with the time.

5. The method of claim 1, wherein the target area is a cell identifier, an identifier defining boundaries of a physical area, or data defining boundaries of a physical area.

6. The method of claim 1, wherein the first FLUTE session and the second FLUTE session are the same session and the same session is a FLUTE user-data session, each data set in the plurality of data sets is contained in an FDT instance, and the identifier is a transmission object identifier (TOI) whose value equals 0.

7. The method of claim 1, wherein the first FLUTE session and the second FLUTE session are the same session and the same session is a FLUTE user-data session, the plurality of data sets are in FLUTE packets carrying auxiliary data file objects, the identifier is a transmission object identifier (TOI) whose value is unequal to 0, and the method further comprises receiving metadata in a FLUTE service announcement session, the metadata providing information for finding the plurality of the data sets in the FLUTE packets.

8. The method of claim 1, wherein the first FLUTE session is a FLUTE service announcement session and the second FLUTE session is a FLUTE user-data session.

9. The method of claim 8, wherein the plurality of data sets are received in one or more metadata fragment instances associated with a user service bundle description during a multimedia broadcast multicast service (MBMS) user service discovery/announcement.

10. The method of claim 9, wherein the one or more metadata fragment instances comprise at least one filter description instance associated with the user service bundle description.

11. The method of claim 10, wherein the at least one filter description instance associated with the user service bundle description references at least one content item of one or more user service descriptions.

12. The method of claim 10, wherein the at least one filter description instance is associated with a schedule instance associated with the user service bundle description.

13. The method of claim 9, wherein the one or more metadata fragment instances comprise a session description instance associated with the user service bundle description.

14. The method of claim 1, wherein the received broadcast is a portion of an entire broadcast, and the method further comprises determining whether to receive a remaining portion of the entire broadcast based on whether the criterion associated with the target area is satisfied.

15. An apparatus for wireless communication, comprising:

means for receiving a plurality of data sets in a first file delivery over unidirectional transport (FLUTE) session, each data set of the plurality of data sets comprising an identifier, a target area associated with a broadcast, at least one additional target area, and logical operators, wherein the plurality of data sets are received in at least one of: 1) a multimedia broadcast multicast service (MBMS) user service discovery/announcement via application service level signaling, and 2) a logical channel via radio access network level signaling;

means for receiving a broadcast and an identifier associated with the broadcast in a second FLUTE session;

means for determining the target area associated with the received broadcast based on the identifier received with the received broadcast; and means for determining whether to keep the received broadcast based on whether a criterion associated with the target area is satisfied, wherein satisfaction of the criterion is based on the target area and the at least one additional target area as a function of the logical operators.

16. The apparatus of claim 15, further comprising means for determining a previous location, a current location, or a predictive future location of the apparatus, wherein the criterion evaluation is based on whether the previous location, the current location, or the predictive future location is within the target area.

17. The apparatus of claim 15, wherein each data set further comprises at least one content reference indicating at least one content for which the data set applies.

18. The apparatus of claim 15, wherein each data set further comprises a time associated with the target area, and the criterion is associated with the time.

19. The apparatus of claim 15, wherein the target area is a cell identifier, an identifier defining boundaries of a physical area, or data defining boundaries of a physical area.

20. The apparatus of claim 15, wherein the first FLUTE session and the second FLUTE session are the same session and the same session is a FLUTE user-data session, each data set in the plurality of data sets is contained in an FDT instance, and the identifier is a transmission object identifier (TOI) whose value equals 0.

21. The apparatus of claim 15, wherein the first FLUTE session and the second FLUTE session are the same session and the same session is a FLUTE user-data session, the plurality of data sets are in FLUTE packets carrying auxiliary data file objects, the identifier is a transmission object identifier (TOI) whose value is unequal to 0, and the apparatus further comprises means for receiving metadata in a FLUTE service announcement session, the metadata providing information for finding the plurality of the data sets in the FLUTE packets.

22. The apparatus of claim 15, wherein the first FLUTE session is a FLUTE service announcement session and the second FLUTE session is a FLUTE user-data session.

23. The apparatus of claim 22, wherein the plurality of data sets are received in one or more metadata fragment instances associated with a user service bundle description during a multimedia broadcast multicast service (MBMS) user service discovery/announcement.

24. The apparatus of claim 23, wherein the one or more metadata fragment instances comprise at least one filter description instance associated with the user service bundle description.

25. The apparatus of claim 24, wherein the at least one filter description instance associated with the user service bundle description references at least one content item of one or more user service descriptions.

26. The apparatus of claim 24, wherein the at least one filter description instance is associated with a schedule instance associated with the user service bundle description.

27. The apparatus of claim 23, wherein the one or more metadata fragment instances comprise a session description instance associated with the user service bundle description.

28. The apparatus of claim 15, wherein the received broadcast is a portion of an entire broadcast, and the apparatus further comprises means for determining whether to receive a remaining portion of the entire broadcast based on whether the criterion associated with the target area is satisfied.

29. An apparatus for wireless communication, comprising:
a memory, and
a processing system coupled to the memory and configured to:
receive a plurality of data sets in a first file delivery over unidirectional transport (FLUTE) session, each data set of the plurality of data sets comprising an identifier, a target area associated with a broadcast, at least one additional target area, and logical operators, wherein the plurality of data sets are received in at least one of: 1) a multimedia broadcast multicast service (MBMS) user service discovery/announcement via application service level signaling, and 2) a logical channel via radio access network level signaling;
receive a broadcast and an identifier associated with the broadcast in a second FLUTE session;
determine the target area associated with the received broadcast based on the identifier received with the received broadcast; and
determine whether to keep the received broadcast based on whether a criterion associated with the target area is satisfied, wherein satisfaction of the criterion is based on the target area and the at least one additional target area as a function of the logical operators.

30. The apparatus of claim 29, wherein the at least one processor is further configured to determine a previous location, a current location, or a predictive future location of the UE, wherein the criterion evaluation is based on whether the previous location, the current location, or the predictive future location is within the target area.

31. The apparatus of claim 29, wherein the first FLUTE session is a FLUTE service announcement session and the second FLUTE session is a FLUTE user-data session.

32. The apparatus of claim 31, wherein the plurality of data sets are received in one or more metadata fragment instances associated with a user service bundle description during a multimedia broadcast multicast service (MBMS) user service discovery/announcement.

33. The apparatus of claim 32, wherein the one or more metadata fragment instances comprise at least one filter description instance associated with the user service bundle description.

34. The apparatus of claim 33, wherein the at least one filter description instance associated with the user service bundle description references at least one content item of one or more user service descriptions.

35. The apparatus of claim 33, wherein the at least one filter description instance is associated with a schedule instance associated with the user service bundle description.

36. The apparatus of claim 32, wherein the one or more metadata fragment instances comprise a session description instance associated with the user service bundle description.

37. The apparatus of claim 29, wherein the received broadcast is a portion of an entire broadcast, and the apparatus further comprises determining whether to receive a remaining portion of the entire broadcast based on whether the criterion associated with the target area is satisfied.

38. A non-transitory computer-readable medium storing computer executable code, comprising code to:
receive a plurality of data sets in a first file delivery over unidirectional transport (FLUTE) session, each data set of the data sets comprising an identifier, a target area associated with a broadcast, at least one additional target area, and logical operators, wherein the plurality of data sets are received in at least one of: 1) a multimedia broadcast multicast service (MBMS) user service discovery/announcement via application service level signaling, and 2) a logical channel via radio access network level signaling;
receive a broadcast and an identifier associated with the broadcast in a second FLUTE session;
determine the target area associated with the received broadcast based on the identifier received with the received broadcast; and
determine whether to keep the received broadcast based on whether a criterion associated with the target area is satisfied, wherein satisfaction of the criterion is based on the target area and the at least one additional target area as a function of the logical operators.

39. A method of a user equipment (UE), comprising:
receiving a data set in a file delivery over unidirectional transport (FLUTE) session, the data set comprising a target area associated with a broadcast, at least one additional target area and logical operators, wherein the data set is received in at least one of: 1) a multimedia broadcast multicast service (MBMS) user service discovery/announcement via application service level signaling, and 2) a logical channel via radio access network level signaling;
determining a location of the UE;
determining whether a criterion is satisfied based on the target area and the at least one additional target area as a function of the logical operators; and
receiving the broadcast associated with the data set in the FLUTE session only when the criterion is satisfied.

40. The method of claim 39, wherein the location is a previous location, a current location, or a predictive future location of the UE, and the criterion evaluation is based on whether the previous location, the current location, or the predictive future location is within the target area.

41. The method of claim 39, wherein each data set further comprises at least one content reference indicating at least one content for which the data set applies.

42. The method of claim 39, wherein the data set further comprises a time associated with the target area, and the criterion is associated with the time.

43. The method of claim 39, wherein the target area is a cell identifier, an identifier defining boundaries of a physical area, or data defining boundaries of a physical area.

44. The method of claim 39, wherein the FLUTE session is a FLUTE user-data session and the data set in contained in an FDT instance.

45. The method of claim 39, wherein the FLUTE session is a FLUTE user-data session and the data set is in one or more FLUTE packets carrying auxiliary data file objects.

46. An apparatus for wireless communication, comprising:
- means for receiving a data set in a file delivery over unidirectional transport (FLUTE) session, the data set comprising a target area associated with a broadcast, at least one additional target area, and logical operators, wherein the data set is received in at least one of: 1) a multimedia broadcast multicast service (MBMS) user service discovery/announcement via application service level signaling, and 2) a logical channel via radio access network level signaling;
- means for determining a location of the apparatus;
- means for determining whether a criterion is satisfied based on the target area and the at least one additional target area as a function of the logical operators; and
- means for receiving the broadcast associated with the data set in the FLUTE session only when the criterion is satisfied.

47. The apparatus of claim 46, wherein the location is a previous location, a current location, or a predictive future location of the apparatus, and the criterion evaluation is based on whether the previous location, the current location, or the predictive future location is within the target area.

48. The apparatus of claim 46, wherein each data set further comprises at least one content reference indicating at least one content for which the data set applies.

49. The apparatus of claim 46, wherein the data set further comprises a time associated with the target area, and the criterion is associated with the time.

50. The apparatus of claim 46, wherein the target area is a cell identifier, an identifier defining boundaries of a physical area, or data defining boundaries of a physical area.

51. The apparatus of claim 46, wherein the FLUTE session is a FLUTE user-data session and the data set is contained in an FDT instance.

52. The apparatus of claim 46, wherein the FLUTE session is a FLUTE user-data session and the data set is in one or more FLUTE packets carrying auxiliary data file objects.

53. An apparatus for wireless communication, comprising:
- a memory, and
- a processing system coupled to the memory and configured to:
  - receive a data set in a file delivery over unidirectional transport (FLUTE) session, the data set comprising a target area associated with a broadcast, at least one additional target area, and logical operators, wherein the data set is received in at least one of: 1) a multimedia broadcast multicast service (MBMS) user service discovery/announcement via application service level signaling, and 2) a logical channel via radio access network level signaling;
  - determine a location of the apparatus;
  - determine whether a criterion is satisfied based on the target area and the at least one additional target area as a function of the logical operators; and
  - receive the broadcast associated with the data set in the FLUTE session only when the criterion is satisfied.

54. The apparatus of claim 53, wherein the location is a previous location, a current location, or a predictive future location of the UE, and the criterion evaluation is based on whether the previous location, the current location, or the predictive future location is within the target area.

55. The apparatus of claim 53, wherein each data set further comprises at least one content reference indicating at least one content for which the data set applies.

56. The apparatus of claim 53, wherein the data set further comprises a time associated with the target area, and the criterion is associated with the time.

57. The apparatus of claim 53, wherein the target area is a cell identifier, an identifier defining boundaries of a physical area, or data defining boundaries of a physical area.

58. The apparatus of claim 53, wherein the FLUTE session is a FLUTE user-data session and the data set in contained in an FDT instance.

59. The apparatus of claim 53, wherein the FLUTE session is a FLUTE user-data session and the data set is in one or more FLUTE packets carrying auxiliary data file objects.

60. A non-transitory computer-readable medium storing computer executable code, comprising code to:
- receive a data set in a file delivery over unidirectional transport (FLUTE) session, the data set comprising a target area associated with a broadcast, at least one additional target area, and logical operators, wherein the data set is received in at least one of: 1) a multimedia broadcast multicast service (MBMS) user service discovery/announcement via application service level signaling, and 2) a logical channel via radio access network level signaling;
- determine a location of the wireless device;
- determine whether a criterion is satisfied based on the target area and the at least one additional target area as a function of the logical operators; and
- receive the broadcast associated with the data set in the FLUTE session only when the criterion is satisfied.

* * * * *